(12) United States Patent
Kim et al.

(10) Patent No.: US 12,015,208 B2
(45) Date of Patent: Jun. 18, 2024

(54) ELECTRONIC DEVICE HAVING ANTENNA

(71) Applicant: LG ELECTRONICS INC., Seoul (KR)

(72) Inventors: Dongjin Kim, Seoul (KR); Namyong Kim, Seoul (KR); Sungwon Kim, Seoul (KR); Jihun Ha, Seoul (KR); Youngbae Kwon, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/556,020

(22) PCT Filed: Apr. 20, 2021

(86) PCT No.: PCT/KR2021/004944
§ 371 (c)(1),
(2) Date: Oct. 18, 2023

(87) PCT Pub. No.: WO2022/225073
PCT Pub. Date: Oct. 27, 2022

(65) Prior Publication Data
US 2024/0097322 A1    Mar. 21, 2024

(51) Int. Cl.
H01Q 3/12    (2006.01)
H01Q 1/24    (2006.01)
(Continued)

(52) U.S. Cl.
CPC .............. H01Q 3/12 (2013.01); H01Q 1/24 (2013.01); H01Q 1/38 (2013.01); H01Q 1/46 (2013.01); H01Q 1/48 (2013.01)

(58) Field of Classification Search
CPC .. H01Q 1/24; H01Q 1/38; H01Q 1/46; H01Q 1/48; H01Q 3/12
(Continued)

(56) References Cited

U.S. PATENT DOCUMENTS 9,608,314 B1 * 3/2017 Kwon ................. H01Q 1/521
2009/0315789 A1 * 12/2009 Sung ..................... H01Q 1/24
343/702
(Continued)

FOREIGN PATENT DOCUMENTS

| KR | 1020190115888 | 10/2019 |
| KR | 1020190143029 | 12/2019 |
| KR | 1020200031607 | 3/2020 |

OTHER PUBLICATIONS

PCT International Application No. PCT/KR2021/004944 International Search Report dated Jan. 17, 2022, 2 pages.

Primary Examiner — Hai V Tran
(74) Attorney, Agent, or Firm — LEE, HONG, DEGERMAN, KANG & WAIMEY

(57) ABSTRACT

A mobile terminal having an antenna according to one embodiment is provided. The mobile terminal comprises: a first metal housing having a left side surface and a right side surface that define the exterior; and a second metal housing having a left side surface, a right side surface, and a bottom side surface that define the exterior. A first conductive member and a second conductive member of the second metal housing each include a first sub member disposed on a lower side surface and a second sub member disposed on a left side surface or a right side surface; the left side surface of the first metal housing and the second sub member of the second metal housing overlap; the overlapping first metal housing is not exposed to the exterior, while the second sub member may be exposed to the exterior.

20 Claims, 35 Drawing Sheets

(51) Int. Cl.
*H01Q 1/38* (2006.01)
*H01Q 1/46* (2006.01)
*H01Q 1/48* (2006.01)

(58) Field of Classification Search
USPC .......................................................... 343/702
See application file for complete search history.

(56) References Cited

U.S. PATENT DOCUMENTS

2017/0142241 A1* 5/2017 Kim .......................... H01Q 9/30
2019/0103656 A1 4/2019 Shi et al.
2020/0119439 A1 4/2020 Edwards et al.
2021/0359392 A1* 11/2021 Won ........................ H01Q 5/307

* cited by examiner

FIG. 5B

| SUBCARRIER SPACING: $f_o \times 2^\mu$, $f_o = 15$kMz AND SCALING VALUE $2^\mu \in \{-2, 0, 1, 2,..., 5\}$ | | | | | | | |
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu s$] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT(14 SYMBOLS) : 0.5ms

| 0 | 1 | 15kHz 1 SLOT(2 SYMBOLS) : 0.2ms

| 0 | 1 | 2 | 3 | 30kHz MINI SLOT(4 SYMBOLS) : 0.2ms

| 0 | 1 | 2 | 3 | 4 | 5 | 6 | 60kHz MINI SLOT(7 SYMBOLS) : 0.125ms (a)          (b)

$$\lambda_g = \frac{1}{f\sqrt{\mu\varepsilon}} = \frac{1}{f\sqrt{\mu\varepsilon_0\varepsilon_r}}$$

Free Space : $\lambda/4$ = 23mm (@3.5GHz)

IF $\varepsilon_r$ = 3: $\lambda_g$ = 23x$\frac{1}{\sqrt{3}}$ ≈ 13.3mm (a)

(b)

(a)

(b)

(a)

(b)

| ANT #4 TOTAL EFF. | | | |
|---|---|---|---|
| Freq. | FS | HAND | △ |
| 2.5 | −6.5 | −13.3 | −6.8 |
| 2.6 | −5.9 | −13.3 | −7.4 |
| 2.7 | −6.7 | −13.3 | −6.6 |
| 3.3 | −7.2 | −12.7 | −5.5 |
| 3.5 | −6.4 | −11.9 | −5.5 |
| 3.7 | −5.7 | −12 | −6.3 |
| 3.9 | −6.4 | −12.5 | −6.1 |
| 4.2 | −8.5 | −13.6 | −5.1 |

(a)

(b)

| ANT #2 TOTAL EFF. | | | |
|---|---|---|---|
| Freq. | FS | HAND | △ |
| 1.7 | -7.6 | -12.4 | -4.8 |
| 1.8 | -7.3 | -13.3 | -6 |
| 1.9 | -6.7 | -13.2 | -6.5 |
| 2 | -7.8 | -14.7 | -6.9 |
| 2.1 | -8.6 | -14.5 | -5.9 |
| 2.2 | -9.0 | -14.8 | -5.8 |

| ANT #4 TOTAL EFF. | | | |
|---|---|---|---|
| Freq. | FS | HAND | △ |
| 2.5 | -7.7 | -14.9 | -7.2 |
| 2.6 | -8.1 | -13.4 | -5.3 |
| 2.7 | -7.3 | -12.6 | -5.3 |
| 3.3 | -7.8 | -12.2 | -4.4 |
| 3.5 | -6.9 | -11.3 | -4.4 |
| 3.7 | -6.0 | -11.4 | -5.4 |
| 3.9 | -6.9 | -12.6 | -5.7 |
| 4.2 | -8.6 | -13.2 | -4.6 |

ELECTRONIC DEVICE HAVING ANTENNA

CROSS-REFERENCE TO RELATED APPLICATION(S)

This application is the National Stage filing under 35 U.S.C. 371 of International Application No. PCT/KR2021/004944 filed on Apr. 20, 2021, the contents of which are all incorporated by reference herein in its entirety.

TECHNICAL FIELD

The present disclosure relates to an electronic device having antennas. One particular implementation relates to an electronic device having antennas in an electronic device that changes in size.

BACKGROUND ART

Electronic devices may be classified into mobile/portable terminals and stationary terminals according to mobility. Also, electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive multicast signals to allow viewing of video or television programs As it becomes multifunctional, an electronic device can be allowed to capture still images or moving images, play music or video files, play games, and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated for 5G communication services.

In this regard, electronic devices may be configured to provide 5G communication services in various frequency bands. Recently, attempts have been made to provide 5G communication services using a SUB6 band that is a band of 6 GHz or less. In the future, however, it is also expected to provide 5G communication services by using a millimeter-wave (mmWave) band in addition to the SUB6 band for a faster data rate.

Meanwhile, electronic devices supporting 4G and 5G communication services may be provided in various form factors. As an example of the form factor for the electronic device, a rollable device may be considered. Metal rim frames of electronic devices having various form factors may have an integral structure or a variable structure. In this regard, a rollable device having an integral frame structure has a difficulty in implementing a rollable display.

In this regard, the rollable display may be configured to have a display area which is decreased or increased by a variable mechanism structure. When metal frames of a rollable device having a variable mechanism structure are used as antennas, it is difficult to secure antenna performance owing to the metal frames separated from each other.

DISCLOSURE OF INVENTION

Technical Problem

The present disclosure is directed to solving the aforementioned problems and other drawbacks. One aspect of the present disclosure is to provide a disposition of antennas in rim regions of an electronic device even when a form factor changes.

Another aspect of the present disclosure is to provide a disposition of antennas in rim regions in a rollable device which has a display rollable to one side.

Still another aspect of the present disclosure is to provide a disposition of antennas in rim regions in a vertical rollable device.

Still another aspect of the present disclosure is to secure antenna performance of a predetermined level or higher while overcoming an antenna design space limitation.

Still another aspect of the present disclosure is to provide an antenna feeding structure in which a change in antenna characteristics is insensitive to a change in size of a mobile terminal.

Solution to Problem

To achieve the above or other aspects, a mobile terminal a mobile terminal having antennas according to one embodiment is provided. The mobile terminal includes a first metal housing including a left side surface and a right side surface defining the exterior of the mobile terminal, and a second metal housing including a left side surface, a right side surface, and a bottom side surface defining the exterior. Each of a first conductive member and a second conductive member of the second metal housing may include a first sub member disposed on the bottom side surface and a second sub member disposed on the left or right side surface. The left side surface of the first metal housing and the second sub member of the second metal housing may overlap each other. The overlapped first metal housing may not be exposed to the exterior while the second sub member is exposed to the exterior.

According to one embodiment, the mobile terminal may include a first printed circuit board (PCB) having a wireless communication unit, a second PCB electrically connected to the first PCB, a third PCB electrically connected to the second PCB, and a display including a first region that is exposed to a front surface in a retracted state of the mobile terminal, and a second region that is an expanded region exposed to the front surface in an expanded state of the mobile terminal.

According to an embodiment, a feed portion and a ground portion may be connected from the second PCB to a first portion of the first metal housing, and a contact portion having tension may be disposed between the first metal housing and the second sub member.

According to an embodiment, a length from the contact portion to an overlap portion between the first portion and the second sub member may be shorter than or equal to ¼ of an operating wavelength of an antenna disposed on at least portion of the second metal housing.

According to an embodiment, the feed portion and the ground portion may be connected from the second PCB to one side of the first portion of the first metal housing, and a second feed portion, a first ground portion, and a second ground portion may be connected from the third PCB to another side of the first part of the first metal housing.

Advantageous Effects of Invention

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separated metal rims can be used for implementing a display sliding part, thereby overcoming an antenna design space limitation and securing antenna performance of a predetermined level or higher.

According to the present disclosure, unlike the related art antenna configuration, a new wireless platform design structure can be provided by designing antennas through lateral side feeding.

Further scope of applicability of the present disclosure will become apparent from the foregoing detailed description. It should be understood, however, that the detailed description and specific examples, such as the preferred embodiment of the disclosure, are given by way of illustration only, since various changes and modifications within the spirit and scope of the invention will be apparent to those skilled in the art.

BRIEF DESCRIPTION OF DRAWINGS

FIG. 5B shows a change in a slot length according to a change in a subcarrier spacing in the NR.

MODE FOR THE INVENTION

Figure 1A:
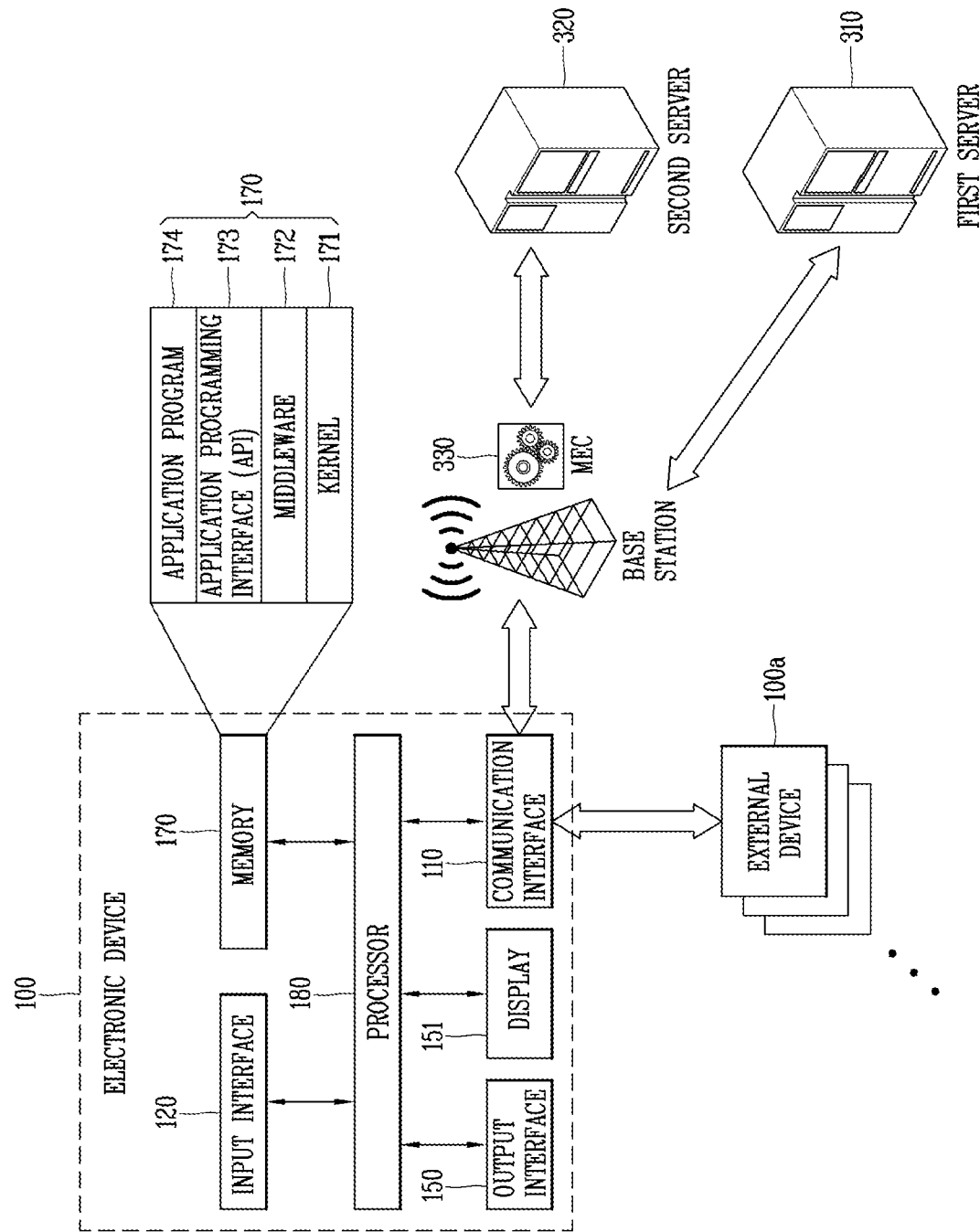
FIG. 1A is a view illustrating a configuration for describing an electronic device in accordance with one embodiment, and an interface between the electronic device and an external device or server.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
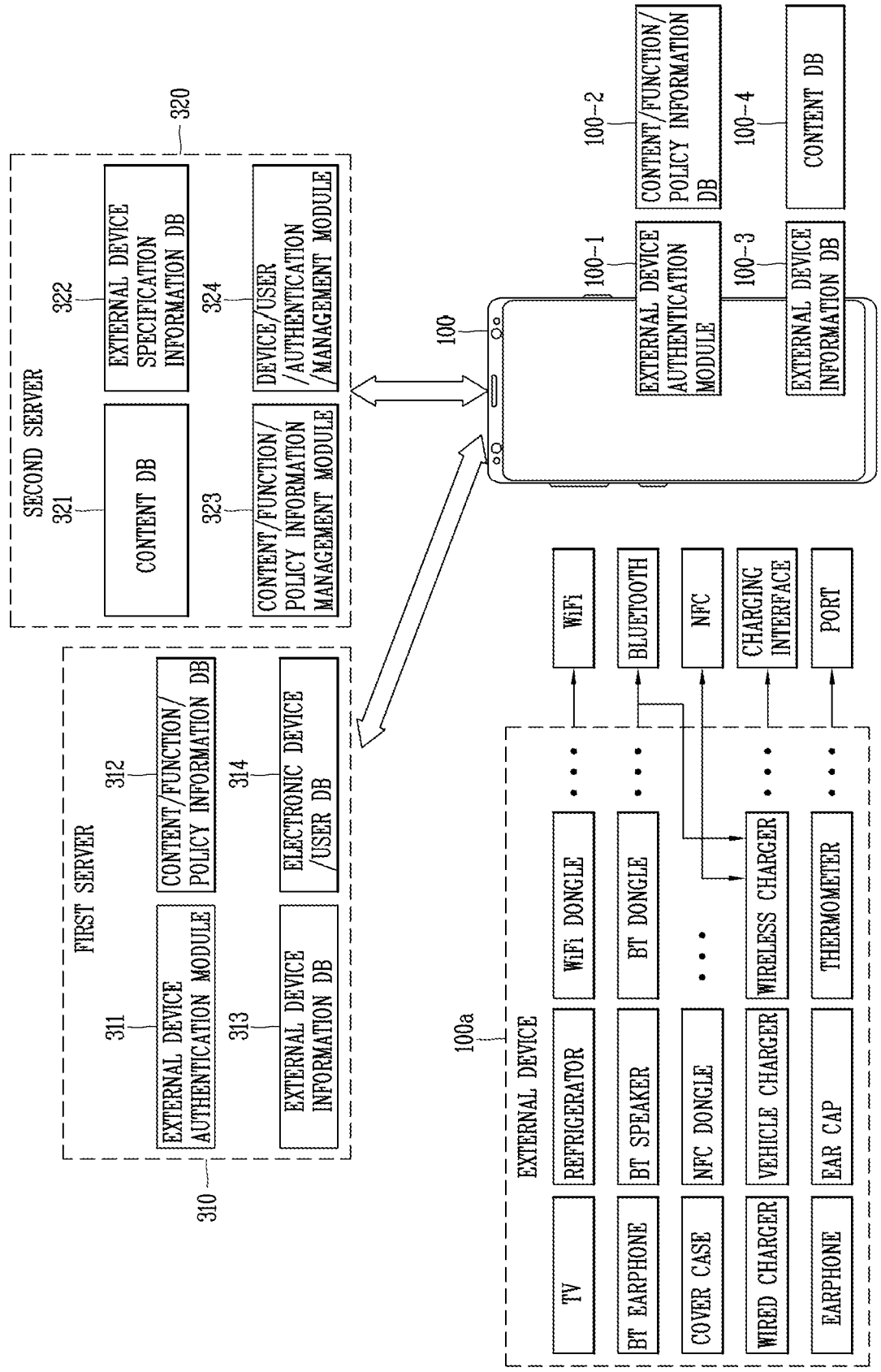
FIG. 1B is a view illustrating a detailed configuration in which the electronic device according to the one embodiment is interfaced with an external device or a server.
Figure 1C:
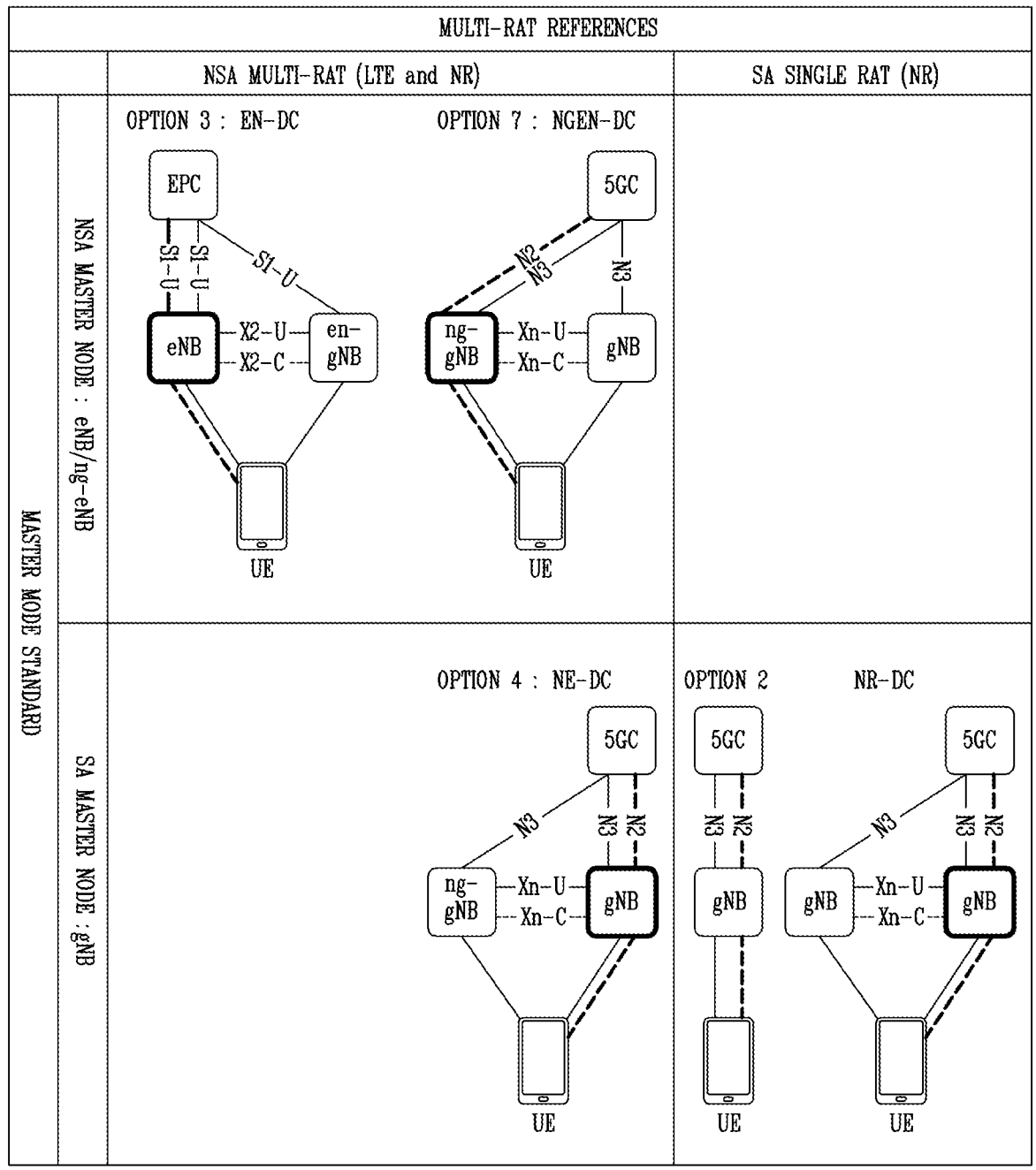
FIG. 1C is a view illustrating a configuration in which the electronic device according to the one embodiment is interfaced with a plurality of base stations or network entities.

Referring to FIGS. 1A to 1C, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
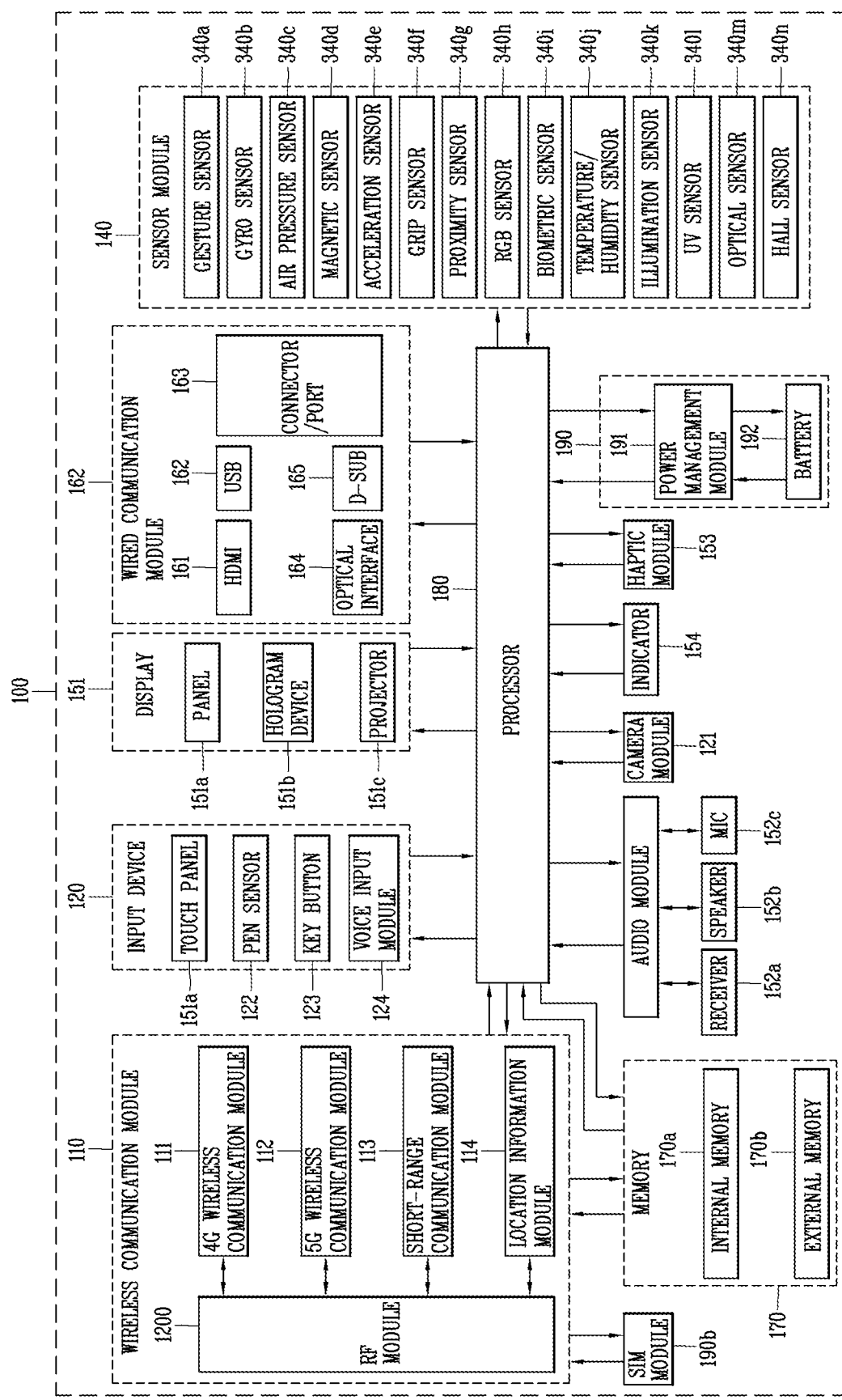
FIG. 2A is a view illustrating a detailed configuration of the electronic device of FIG. 1A.
Figure 2B:
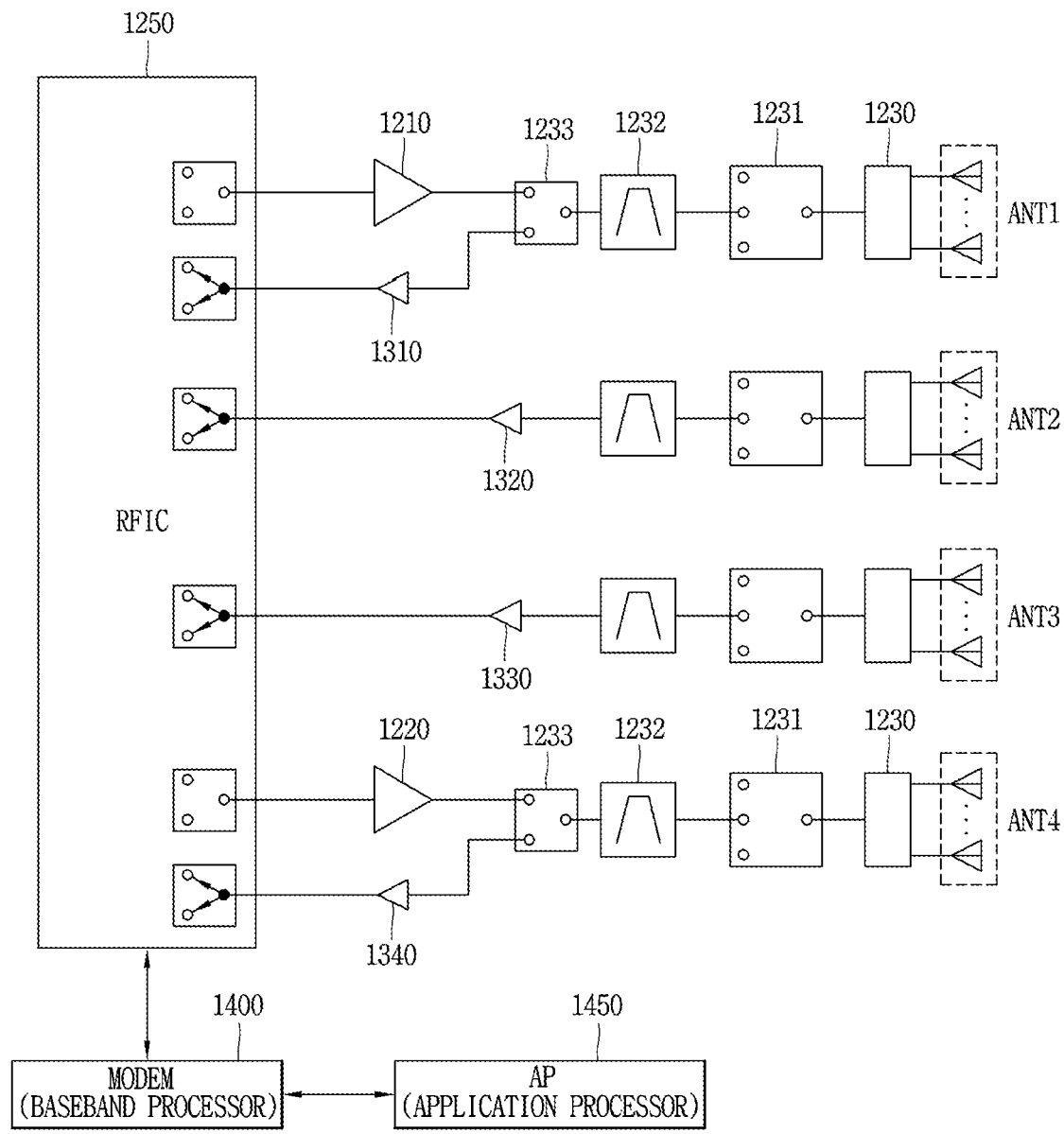
FIG. 2B is a view illustrating a configuration of a wireless communication unit of an electronic device operable in a plurality of wireless communication systems according to an embodiment.
Figure 2C:
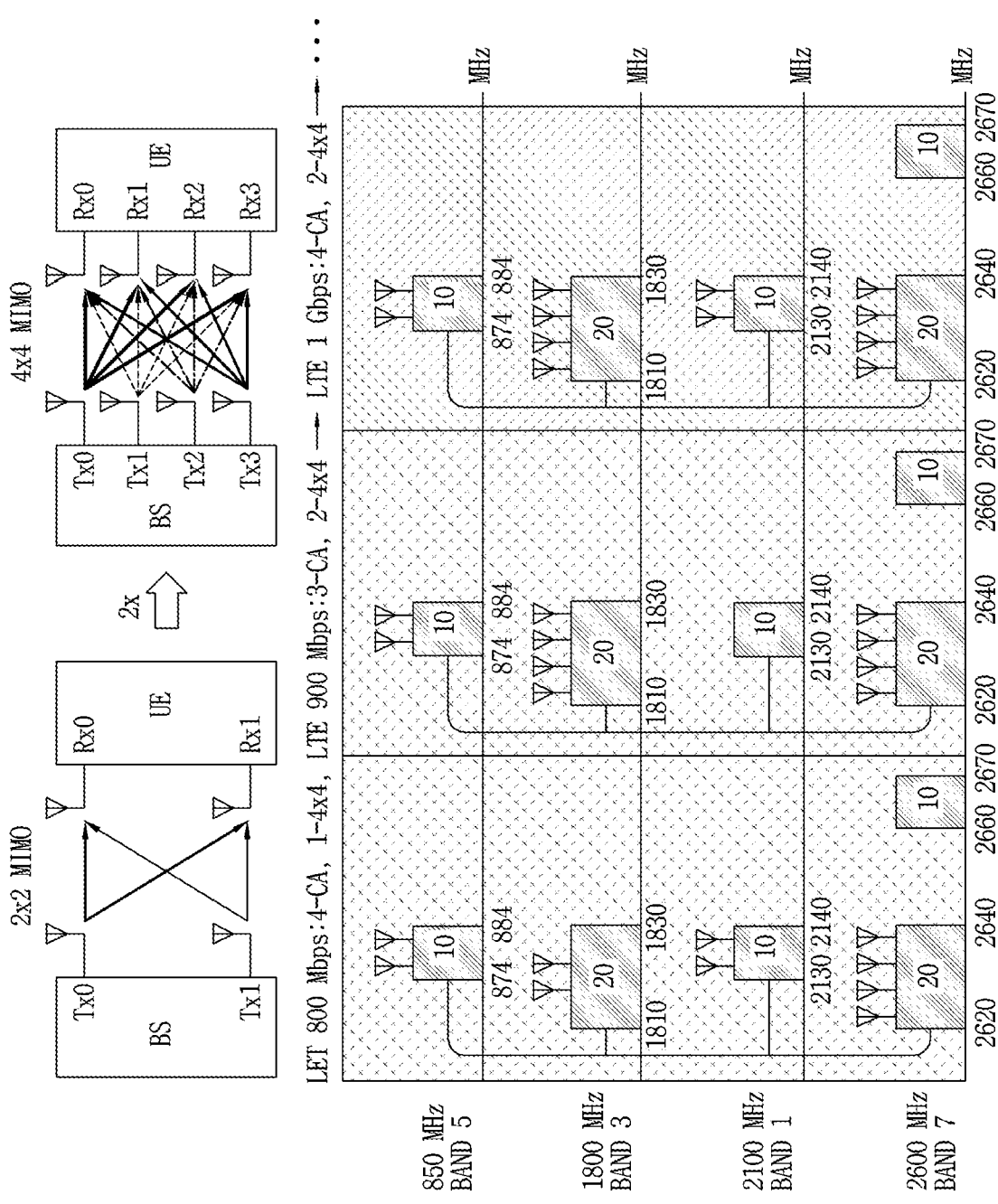
FIG. 2C is a view illustrating a MIMO configuration and a MIMO+carrier aggregation (CA) configuration between a UE and a base station (BS) in accordance with one embodiment.

Meanwhile, referring to FIGS. 2A to 2B, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1A is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1A and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) architecture. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub-6 frequency band that is a band of 6 GHz or less may be used as the 5G frequency band.

In contrast, a millimeter-wave (mmWave) band may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network," and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g., RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory 170a and an external memory 170b. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, and for example, may include at least one interface or function (e.g., command) for file control, window control, image processing, or text control.

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an embodiment, when the electronic device 100 should perform a specific function or service automatically or at a request, the electronic device 100, instead of executing the function or service on its own or additionally, may request another device (e.g., the external device 100a, the first server 310, and the second server 320) to perform at least some functions associated therewith. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least some of the components may cooperably operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1A and 1B, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an embodiment, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an embodiment, the electronic device 100 may be connected to at least one external device 100a through a wired or wireless communication interface to receive or transmit information. For example, the electronic device 100 and the at least one external device 100a may transmit or receive information through near field communication (NFC), a charger (e.g., universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting or decrypting at least one of various types of information included in external device information or storage and manage such information in a physical/virtual memory area which is not accessible directly from outside. According to one embodiment, the at least one external device 100a may perform communication with the electronic device 100 or may provide information through communication between the external devices. According to one embodiment, the at least one external device may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 using a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Option 4 represents NR-E-UTRA Dual Connectivity (NE-DC). Option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC. There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is the eNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

FIG. 2B is a diagram illustrating a configuration of a wireless communication unit of an electronic device operable in a plurality of wireless communication systems according to an embodiment. Referring to FIG. 2B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device includes a plurality of low noise amplifiers (LNAs) 1310 to 1340 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure may not be limited thereto. The RFIC 250 may be configured as a 4G/5G separate type according to an application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another embodiment, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in a 4G band or a Sub-6 band, the first and second power amplifiers 1210 and 1220 may operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2B. At this time, 4×4 DL MIMO may be performed through downlink (DL).

In this regard, MIMO is a key technology to improve the throughput. It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beam-forming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beam-forming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a Sub 6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power PCMAX,c, a lower limit PCMAX_L,c and an upper limit PCMAX_H,c may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device that is operable in the plurality of wireless communication systems according to an embodiment may further include a duplexer 1231, a filter 1232, and a switch 1233.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an embodiment of the present disclosure, the switch 1233 may be configured in a single-pole double-throw (SPDT) type to separate a transmission signal and a reception signal in a time division duplex (TDD) scheme. In this case, the transmission signal and the reception signal are signals of the same frequency band, and thus the duplexer 1231 may be implemented as a type of circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 1310 to 1340 to receive a 4G signal or a 5G signal at a specific time interval.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system. The multi-transceiving system as shown in FIG. 2B may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

Figure 5A:
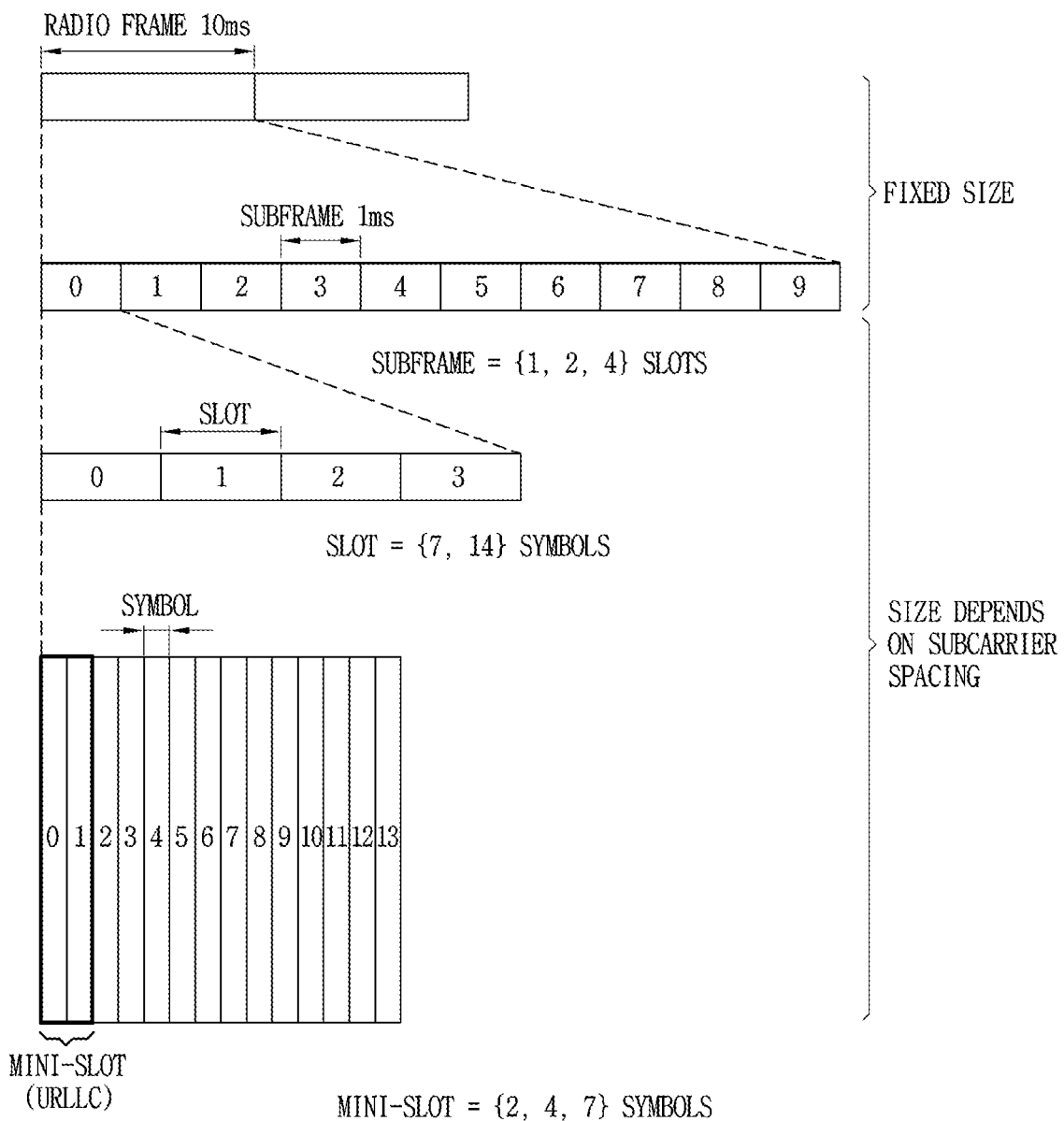
FIG. 5A is a view illustrating an example of a frame structure in NR.

On the other hand, two different wireless communication systems may be implemented with one antenna using an antenna that serves for both transmission and reception by integrating a transmission unit and a reception unit. Here, 4×4 MIMO may be implemented using four antennas as shown in FIG. 5A. In this case, 4×4 DL MIMO may be performed through downlink (DL).

In this regard, MIMO is a key technology to improve the throughput. In this regard, FIG. 2C is a diagram illustrating a MIMO configuration and a MIMO+carrier aggregation (CA) configuration between a UE and a base station (BS) in accordance with one embodiment. Referring to FIG. 2C, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS).

In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB can decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 2C, 4-CA and 1-4×4 MIMO (2.6 GHz) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHz) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. Meanwhile, 5-CA and 3-4×4 MIMO supporting 1.2 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a Sub 6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power PCMAX,c, a lower limit PCMAX_L,c and an upper limit PCMAX_H,c may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

Figure 3A:
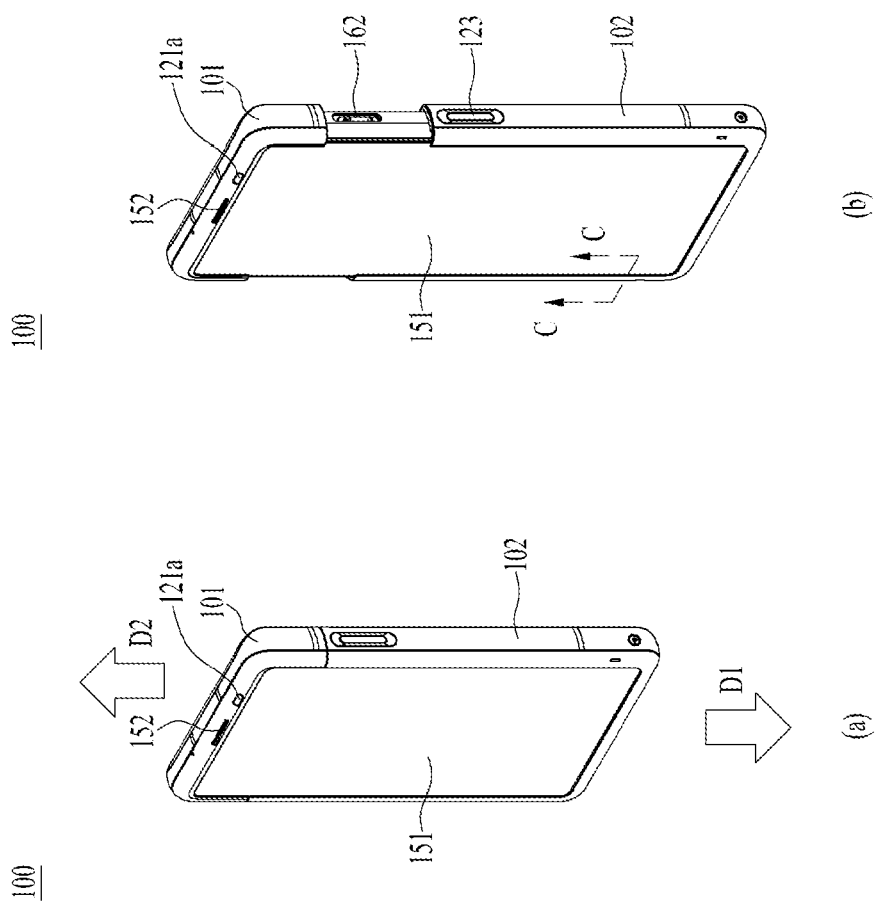
FIGS. 3A and 3B are views illustrating a mobile terminal 100 that may change in size.
Figure 3B:
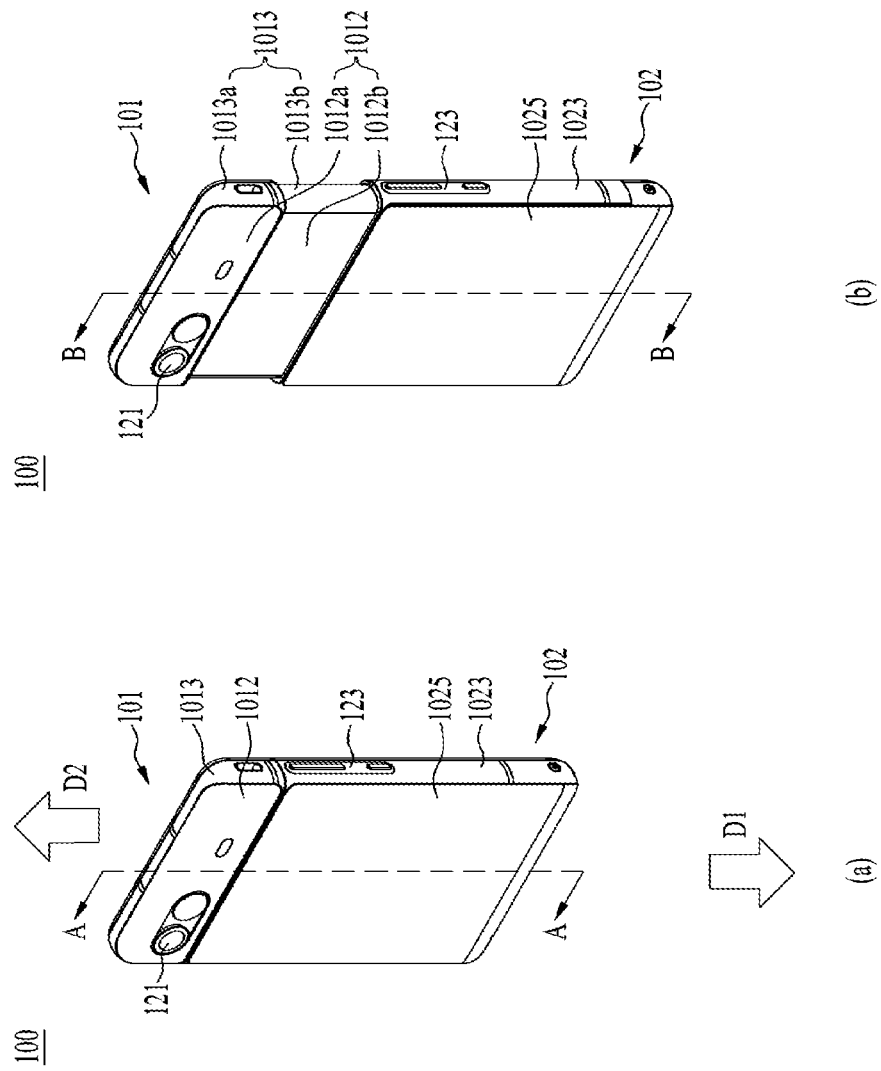

FIGS. 3A and 3B are views illustrating a mobile terminal 100 that may change in size. FIG. 3A is a front view of a first state and a second state of the mobile terminal 100, and FIG. 3B is a rear view of the first state and the second state of the mobile terminal 100. The mobile terminal 100 includes frames 101 and 102 that slide relative to each other to change a size of the mobile terminal 100. The frames include a first frame 101, and a second frame 102 that is slidable relative to the first frame 101. When the second frame 102 moves in a first direction D1, the mobile terminal 100 is switched to an expanded state (second state). On the other hand, when the second frame 102 moves in a second direction opposite to the first direction, the mobile terminal 100 is switched to a retracted state (first state).

The movement of the second frame 102 is a relative movement to the first frame 101. Based on the second frame 102, the mobile terminal 100 is switched to the expanded second state when the first frame 101 is slid in the second direction D2, while being switched to the retracted first state when the first frame 101 is slid in the first direction D1.

As in the embodiment of the present disclosure, when the first frame 101 and the second frame 102 are disposed up and down, since a user grips the lower second frame 102, the first frame 101 moves upward from the user's perspective, and thus it may be recognized that the mobile terminal 100 is expanded upward.

In the following description, a direction that the mobile terminal 100 and the display 151 extend or enlarge is referred to as the first direction D1, a direction that the mobile terminal 100 and the display 151 are contracted, retracted or reduced to be switched from the second state to the first state is referred to as the second direction, and directions perpendicular to the first and second directions are referred to as third and fourth directions. In the drawings, the first and second directions are vertical and the third and fourth directions are horizontal, but the first and second directions may be horizontal and the third and fourth directions may be vertical depending on the placement of the mobile terminal 100.

(a) of FIG. 3A and (a) of FIB. 3B illustrate the first state as the retracted state, and (b) of FIG. 3A and (b) of FIG. 3B illustrate the second state as the expanded state. As in the state that the second frame 102 is expanded by sliding in the first direction, an overlap portion is present between the first frame 101 and the second frame 102.

In the first state, the first frame 101 and the second frame 102 may be configured such that one of the first frame 101 and the second frame 102 is located outside while surrounding the other, or may be configured in a shape in which the first frame 101 has a portion located outside and the second frame 102 has a portion located outside.

In order to expand the mobile terminal 100 by moving the second frame 102 relative to the first frame 101, the first frame 101 and the second frame 102 partially overlap each other. At least one of the first frame 101 or the second frame 102 may include a portion that is located inside in the retracted state of the mobile terminal 100 and then exposed to outside when the mobile terminal 100 is expanded. A rear surface and side surfaces of the mobile terminal 100 may include portions that are located inside another member in the first state and selectively exposed when switched to the second state. In the embodiment, the externally-exposed portion of the second frame may be constant, and the first frame may include an always externally-exposed portion and a selectively-exposed portion.

As illustrated in (b) of FIG. 3, an expanded front surface of the mobile terminal in the expanded second state is covered with the display 151, such that the inside of the mobile terminal 100 is not exposed.

Depending on whether the frames 101 and 102 of the mobile terminal 100 expand, an area of the display 151 located on the front surface of the mobile terminal 100 may vary. A front surface of the display 151 may have a larger area in the second state than that in the first state. The display 151 includes a fixed part 151a that is fixed to a front surface of the first frame 101 and always located on the front surface of the mobile terminal 100 regardless of the state of the mobile terminal 100, and a variable part 151b that is located on the front surface or a rear surface depending on whether the fixed part 151a and the mobile terminal 100 expand.

The fixed part 151a is coupled to the front surface of the first frame 101 of the display 151 and always located on the front surface, so as to define a portion of a front surface portion. The fixed part 151a is fixed to the first frame 101 and thus maintains a constant shape without a change in a bent (or curved) degree (level). On the other hand, the variable part 151b indicates a bent portion which changes in angle or position. In the second state of the mobile terminal, the variable part moves to the front surface such that the fixed part and the variable part are all located on the front surface portion.

The variable part 151b includes side surface portions located in a lateral (surface) direction of the mobile terminal 100, and positions of the side surface portions vary depending on the position of the second frame 102. With respect to the side surface portions, an area of a region of the variable part located on the front surface and an area of a region located on the rear surface vary. The variable part 151b may partially be a front surface portion and partially be a rear surface portion depending on the first state and the second state.

With respect to the mobile terminal 100, the variable part 151b is located in the first direction with respect to the fixed part 151a, and an end portion of the variable part 151b is bent toward the rear surface of the mobile terminal 100 to be slid on the rear surface of the second frame 102.

A slide frame 103 is coupled to the end portion of the variable part 151b of the display 151 such that the end portion is guided to be slid on the rear surface of the second frame 102. The slide frame 103 moves in the first direction on the second frame 102 at the same time when the second frame 102 moves in the first direction. Therefore, the slide frame 103 moves with respect to the first frame 101 by a distance twice a movement distance with respect to the second frame 102.

In such a way, the display 151 may be configured as a flexible display 151 that is bent such that the variable part 151b of the display 151 can move toward the front surface or the rear surface. The flexible display 151 is a display that can be maintained in a flat state like the existing flat display, and also can be bent, curved, folded, twisted, or rolled like paper. The flexible display 151 denotes a solid display that is manufactured on a thin and flexible substrate and thus is light and not breakable. The flexible display 151 may be bent in a specific direction like paper. The flexible display according to the present disclosure may be disposed such that a radius of curvature thereof changes in the first direction.

In addition, an electronic paper is a display to which general ink characteristics are applied, and is different from the existing flat panel display in view of using reflected light. The electronic paper may change information by using a twist ball or electrophoresis (electrophoresis) using a capsule. In a state where the flexible display 151 is not deformed (e.g., a state having an infinite radius of curvature, hereinafter, referred to as a default (basic) state), the display region of the flexible display is flat. When the default state is switched to a state where the flexible display is deformed by an external force (e.g., a state having a finite radius of curvature, hereinafter, referred to as a deformed state), the display region may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color. In this case, when an external force is applied to the flexible display 151, the flexible display 151 may be deformed from the default state as a flat state into a curved state not the flat state.

Meanwhile, the flexible display unit 151 may be combined with a touch sensor to implement a flexible touch screen. When a touch is input to the flexible touch screen, the controller 180 (see FIG. 1) may perform a control corresponding to the touch input. The flexible touch screen may be configured to sense a touch input even in the deformed state as well as the default state.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151 or capacitance occurring at the specific part, into electric input signals. The touch sensor may be configured to detect a touch position, a touch area, touch pressure, touch capacitance, and the like by a touch object applying a touch onto the touch screen.

On the other hand, the mobile terminal 100 may include a deformation sensor which senses the deformation of the flexible display 151. The deformation sensor may be included in the sensing unit 140 (see FIG. 2A).

The deformation sensor may be provided in the flexible display 151 or cases (a first frame 101 and a second frame 102 to be described later) to sense information related to the deformation of the flexible display 151. Here, the information related to the deformation of the flexible display 151 may be a deformed direction, a deformed degree, a deformed position, a deformed time, an acceleration that the deformed flexible display 151 is restored, and the like. In addition to those, such information may be various information which can be sensed in response to curving of the flexible display 151.

In addition, the controller 180 may change information displayed on the flexible display 151 or generate a control signal for controlling the function of the mobile terminal 100 based on the information related to the deformation of the flexible display 151 detected by the deformation detecting unit.

The deformation of the flexible display 151 may vary depending on the positions of the first frame 101 and the second frame 102. As illustrated in FIG. 3A, since a position where the flexible display 151 is bent is determined according to the positions of the first frame 101 and the second frame 102, a position where the flexible display 151 is to be bent and an area of the flexible display 151 on the front surface may be calculated not by the deformation detecting unit of the flexible display 151 but according to the positions of the first frame 101 and the second frame 102.

The switching of the state (first or second state) of the flexible display 151, namely, the change in the size of the display 151 on the front surface and the rear surface of the mobile terminal 100 according to the change in the size of the mobile terminal 100 may be manually performed by force applied by the user, but the present disclosure may not be limited to the manual method. For example, when the mobile terminal 100 or the flexible display 151 is in the first state, the flexible display 151 may be deformed to the second state by a command of the user or an application, without external force applied by the user. In this way, to automatically deform the flexible display 151 without external force, the mobile terminal 100 may include a driving unit 200 to be explained later.

The flexible display 151 is bent by 180 degrees while rolling around a side portion of the mobile terminal 100 in the first direction. Accordingly, one portion of the flexible display 151 is disposed on the front surface of the mobile terminal, based on the side portion of the mobile terminal 100, and another portion of the flexible display 151 is disposed on the rear surface of the mobile terminal 100. For convenience of explanation, the portion of the flexible display unit 151 located on the front surface is referred to as a front surface portion, and the another portion located on the rear surface is referred to as a rear surface portion. The mobile terminal, as illustrated in FIG. 3A, may be expanded in the first direction or retracted in the second direction opposite to the first direction. In this case, a region of the flexible display 151 located on the front surface changes. That is, the front surface portion and the rear surface portion may change in size depending on the change in the state of the mobile terminal.

Also, the flexible display 151 may be rolled onto or unrolled from the side portion of the mobile terminal in the first direction. Accordingly, the portion disposed on the rear surface of the mobile terminal 100 may be moved, so as to adjust the size of the region of the display unit 151 disposed on the front surface of the mobile terminal 100. Since the flexible display 151 has a fixed area and one continuous body, when the area of the front surface portion increases, the area of the rear surface portion decreases. Thus, the display 151 may be rolled into the second frame 102 movable relative to the first frame 101, more precisely, into the side portion of the second frame 102 in the first direction. The display 151 may be pulled out (withdrawn) from or pushed (inserted) into the second frame 102 while being rolled on the second frame 102 along a moving direction of the second frame 102, so as to adjust the area of the display 151 on the front surface of the mobile terminal 100.

The variable part 151b requires a support structure on the rear surface in order to maintain the flat state because it is flexible. A rolling hinge may be further provided to support the rear surface of the variable part 151b. The rolling hinge may be bendable while the variable part 151b is bent and may allow the variable part 151b to be maintained in the flat state.

The rolling hinge 104 may be located on the rear surface of the variable part 151b of the display 151, and may support the variable part 151b to be bent in the first direction but maintained flat without being bent in the third direction. The rolling hinge 104 may include a plurality of support bars extending in the third direction. The plurality of support bars may be disposed in parallel in the first direction. The rolling hinge 104 may be bent together with the variable part 151b through a change in angle between the support bars. Both end portions of the support bar may include slide hooks that guide the movement of the display 151 while moving along slide rails disposed on the second frame 102.

A rolling seat located between the support bar and the display 151 may include a cuff pattern configured by a plurality of slits which extend in the third direction to facilitate the deformation in the first direction. The cuff pattern, which has the slits extending in the third direction and are disposed in a zigzag form, restricts the deformation in the third direction while allowing bending in the first direction.

The second frame 102 may include a roll bracket 1028 (see FIG. 4) having a curved surface therein. There is no limitation in position of the roll bracket 1028, but the roll bracket 1028 may be disposed on the end portion of the second frame 102 in the first direction in order to provide a screen with the largest size on the front surface. The roll bracket 1028 may have a bar-like shape that has a curved surface, on which the display 151 can be rolled, and extends in the third direction perpendicular to the first direction.

Also, in order to suppress damage on the display 151 rolled on the roll bracket 1028, a side frame 1024 may be disposed on the end portion of the second frame 102 in the first direction.

Figure 4A:
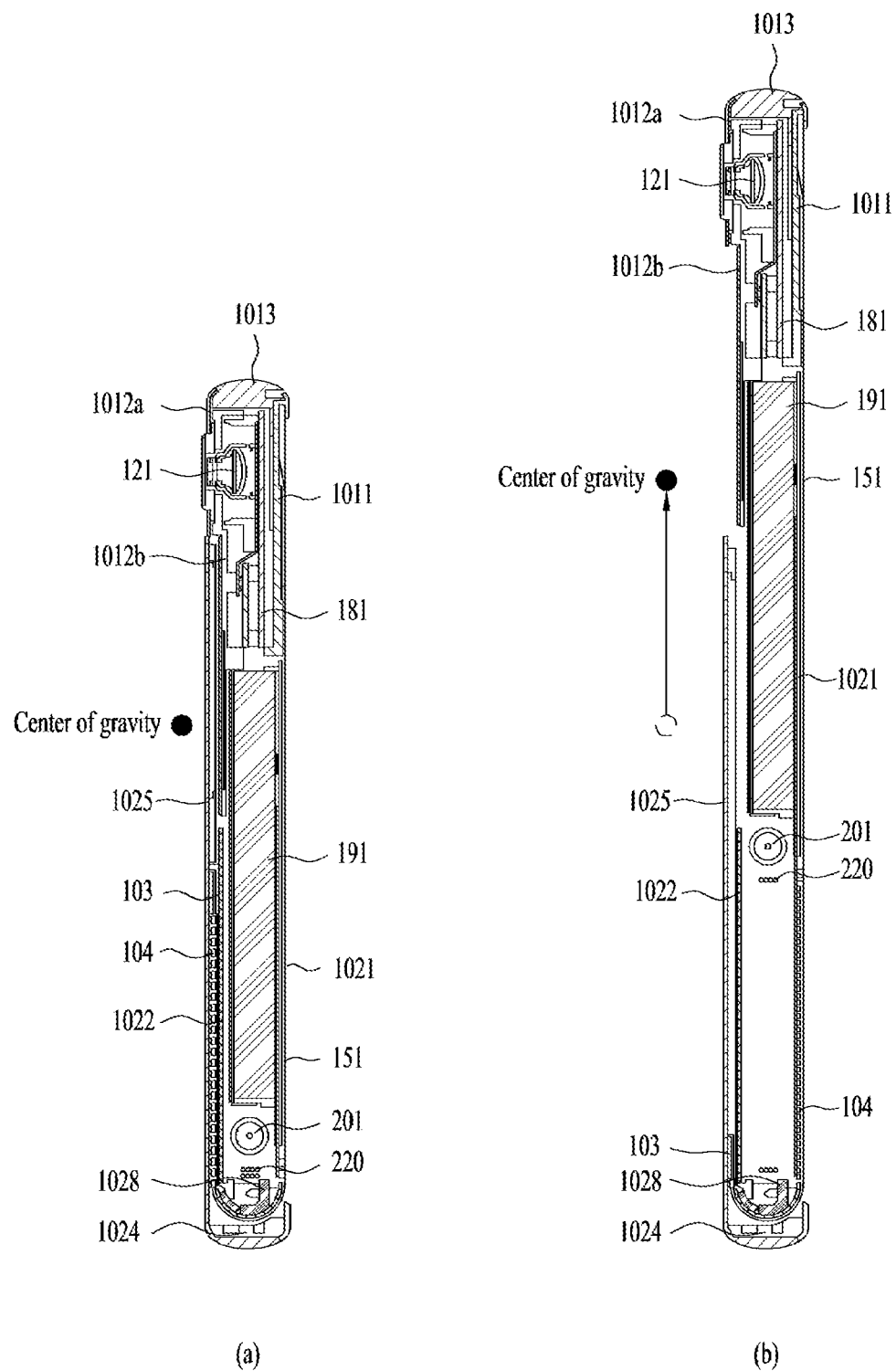
FIG. 4A is a lateral sectional view according to one embodiment of the present disclosure, which illustrate a section taken along the line A-A, and a section taken along the line B-B of FIG. 3B.
Figure 4B:
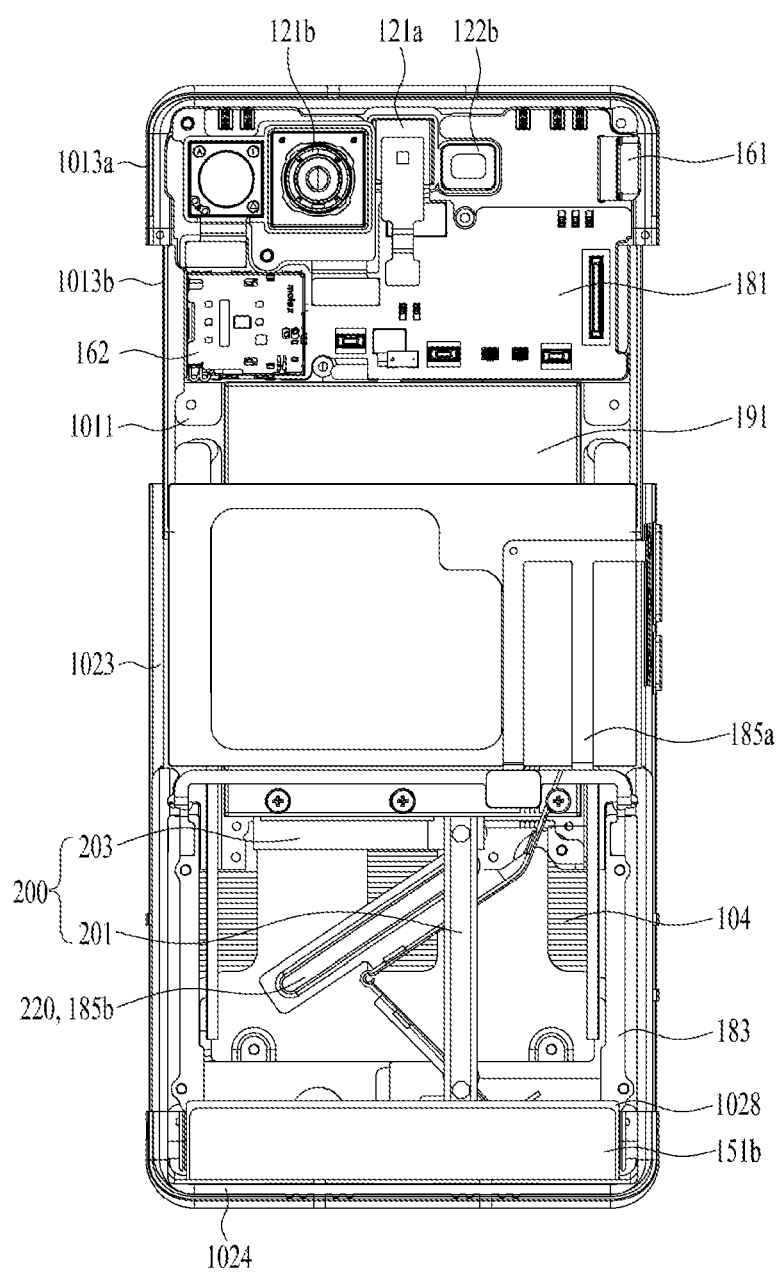
FIG. 4B is a rear view illustrating internal components in a second state of the embodiment of FIG. 4A.

FIG. 4A is a side sectional view according to one embodiment of the present disclosure, and FIG. 3B illustrates a section taken along the line A-A, and a section taken along the line B-B. FIG. 4B is a rear view illustrating internal components in a second state of the embodiment of FIG. 4A. This embodiment illustrates an example in which a battery 191 is mounted in the first frame 101. The battery 191 may be disposed between a first front portion 1011 and a first rear portion 1012 of the first frame 101, and a space open to the bottom of the rear portion 1012 in the second state may be covered with a rear cover 1025.

As in the embodiment of the present disclosure, when the battery 191 is located in the first frame 101, types of components to be mounted in the second frame 102 may be limited, for example, to side antennas and the user input unit 123 or a coil antenna 114 on the rear surface because most of components are located in the first frame 101. Also, since the battery 191 and the main substrate 181 are disposed in the first frame 101, the configuration of a signal connection part 185b for connecting each component can be more simplified.

In this embodiment, when the mobile terminal 100 is switched to the second state, an empty space is defined below the battery 191. The second frame 102 which surrounds front and rear sides of the battery 191 moves in the first direction, and supports the rear surface of the variable part 151b which has moved to the front surface. The second frame 102 located on the rear surface of the variable part 151b forms an empty space therein in the second state. Accordingly, when great force is applied to the front surface, a bending phenomenon may occur. In order to increase support force of the second frame 102, a support link 220 that is unfolded at an expanded portion may further be disposed. The support link 220 is folded in the first state to minimize a mounting space and unfolded in the second state to reinforce rigidity of the expanded portion.

Since the battery 191 is located in the first frame 101, the driving unit 200 may be located in the first direction compared to the battery 191 and may guide the sliding motion between the first frame 101 and the second frame 102.

In this embodiment, a drive motor 201 is located in the first frame 101, a rack gear 203 is located in the second frame 102. The rack gear 203 and the second frame 102 move in the first direction relative to the first frame 101. Since the drive motor 201 is biased to the first direction, the drive motor 201 may be located in the first frame 101 and the rack gear 203 in the second frame, in consideration of a movement space of the rack gear 203.

As in the embodiment, when the battery 191 is disposed in the first frame 101, most of components are disposed in the first frame 101. When the mobile terminal 100 is expanded, the center of gravity is biased to one side. In particular, as in the present disclosure, when the first frame 101 and the second frame 102 are disposed up and down, the center of gravity is moved upward as illustrated in (b) of FIG. 4A, upon an upward movement of the first frame 101. In the state where the user grips the lower portion (second frame) of the mobile terminal, when the center of gravity is moved upward, the user may easily drop the mobile terminal from the hand.

To solve the problem, it is necessary to dispose components inside the frame to be dispersively located in the second state, in order to minimize the movement of the center of gravity even in the second state.

Figure 4C:
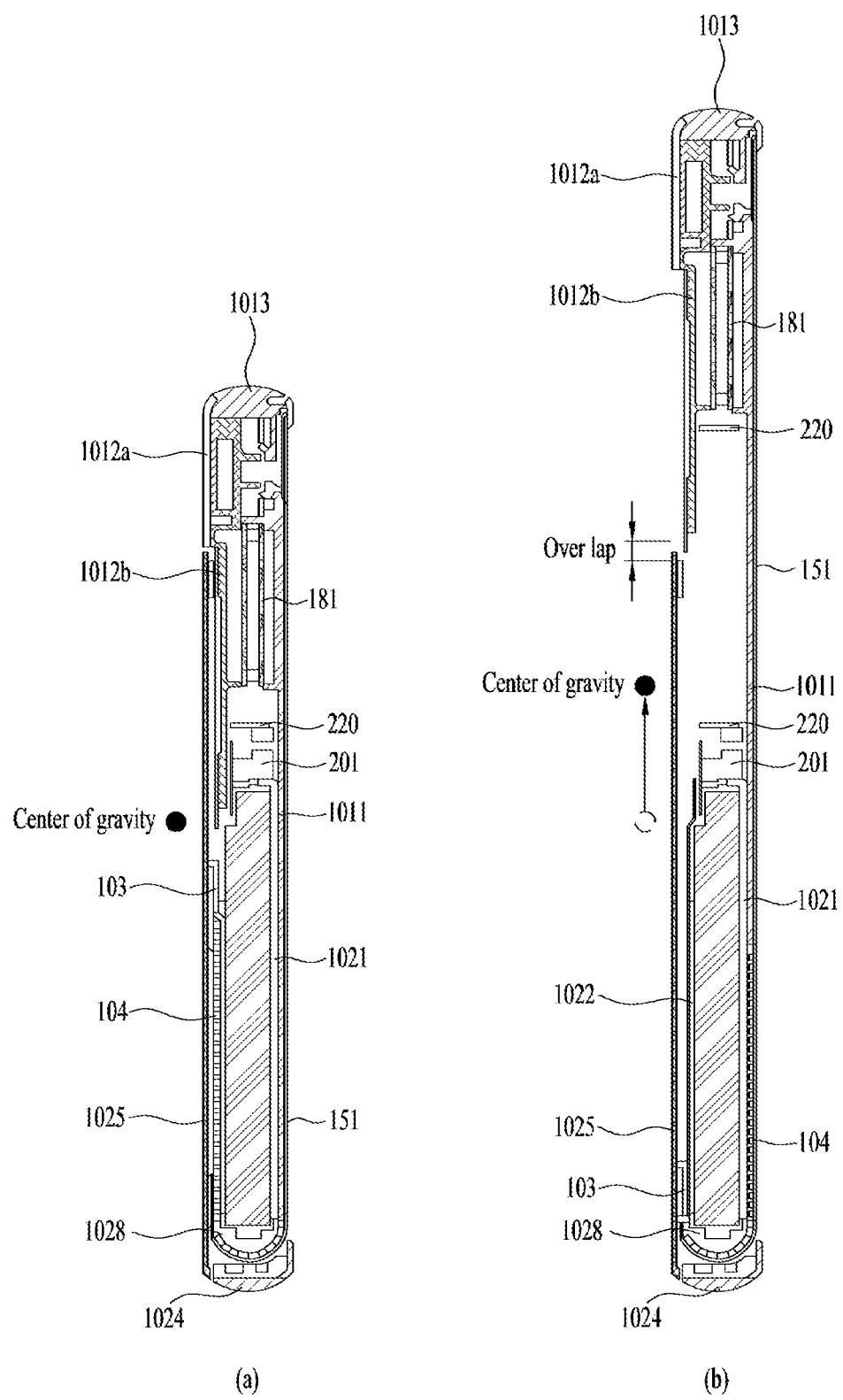
FIG. 4C illustrates another embodiment of the sectional views taken along the lines A-A and B-B of FIG. 3A.
Figure 4D:
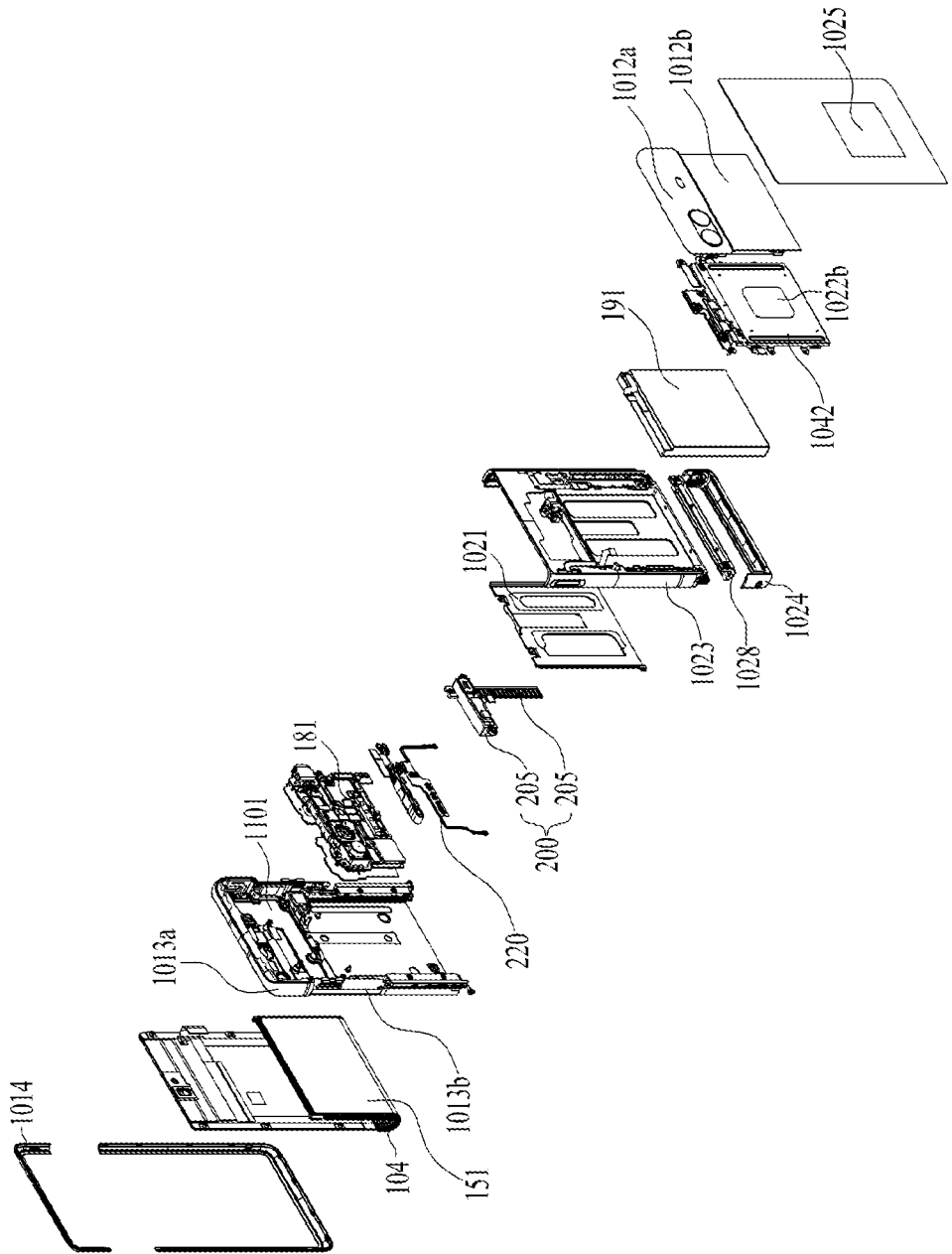
FIG. 4D is an exploded perspective view of the embodiment of FIG. 4C.

As illustrated in FIG. 4C, the battery 191 may be disposed in the second frame of the mobile terminal 100 to minimize the movement of the center of gravity when switched to the second state. FIG. 4C illustrates another embodiment of the sectional views taken along the lines A-A and B-B of FIG. 3A, and FIG. 4D is an exploded perspective view of the embodiment of FIG. 4C.

Hereinafter, each component of the mobile terminal 100 according to the embodiment will be described in more detail, with reference to FIGS. 4C and 4D.

The first frame 101 includes a first front portion 1011 located on the front of the mobile terminal 100 and coupled with the fixed part 151a of the display 151, and a first rear portion 1012 located on the rear of the mobile terminal 100. The first rear portion 1012 may include a first rear surface 1012a that is always exposed to the outside, and a second rear surface 1012b that is exposed to the outside only in the expanded state. The second rear surface 1012b, as illustrated in FIG. 3, is not exposed to the outside in the first state by being covered with the rear cover 1025 of the second frame 102, and exposed to the outside in the second state.

The second frame 102 includes a second front portion 1021 located on the front, and a second rear portion 1022 located on the rear of the mobile terminal 100. The second front portion 1021 is located on a rear surface of the first front portion 1011 in the first state, and is pulled out in the second state from the first front portion 1011 in the first direction.

The display 151 may not be fixed to the second frame 102 but may change in position on the second frame 102, in response to the sliding motion of the second frame 102. The variable part 151b of the display 151 is located on the rear surface and the side surfaces of the second frame in the first state of the mobile terminal 100. The variable part 151b located on the rear surface moves to the front surface of the second frame in the second state.

The second front portion 1021 supports the variable part 151b, which has moved to the front, in the second state. The second rear portion 1022 supports the variable part 151b, which has moved to the rear, in the first state.

The slide frame 103 that is coupled to the end portion of the display 151 to guide the sliding of the display 151 moves on the rear surface of the second rear portion 1022. The end portion of the display 151 coupled to the slide frame 103 is a moving part that slides in response to the movement of the slide frame 103 and is disposed to always face the rear surface of the mobile terminal 100. Since the moving part does not move toward the front surface, it may limit an area of the front surface of the display 151, and pull the variable part 151b moved to the front surface such that the variable part 151b can be fixed in the flat state.

The second frame 102 may further include the rear cover 1025 that covers the variable part 151b located on the rear surface of the second rear portion 1022. When the end portion of the display 151, namely, the moving part is exposed to the outside, the display 151 may be likely to be damaged. The rear cover 1025 may suppress the rear surface portion of the display 151 from being exposed directly to the outside. The second rear portion 1022 may include a guide member (not illustrated) that guides the sliding of the slide frame 103 which moves on the rear surface of the second rear portion 1022. The rear cover 1025 may cover the guide member not to be exposed to the outside.

The rear cover 1025 may be made of an opaque material, and may also include a transparent material. The transparent rear cover 1025 may provide information to the user by utilizing the display 151 located on the rear surface in the first state.

For example, when the user photographs a direction, in which the user is located, using a rear camera, the user may view a preview image of the camera through the display 151 located on the rear surface. Or, when the mobile terminal 100 is placed such that the rear surface faces upward, an alarm or the like may be provided through the display 151 located on the rear surface.

However, since the second rear portion 1022 may be visually exposed through the rear cover 1025 in the second state, the rear cover 1025 may be coated (tinted) to lower transparency such that the inside is visible only when the display 151 is turned on, namely, when light is emitted from the inside.

The rear cover 1025 may extend in the second direction from a portion where it covers the rear surface portion of the display, so as to cover a second rear surface 1012b of the first frame 101. As illustrated in (a) of FIG. 3B, the rear cover 1025 may cover the second rear surface 1012b as well as the first rear surface 1012a in the first state, and define appearance of the rear surface of the mobile terminal 100.

As illustrated in (b) of FIG. 3B, when switched to the second state, the second rear surface 1012b is exposed to the rear surface of the mobile terminal 100. In order for the internal components of the mobile terminal 100 not to be exposed, as illustrated in (b) of FIG. 4C, at least portions of the second rear surface 1012b and the rear cover 1025 may overlap each other even in the second state.

Referring to (a) of FIG. 4C, the second rear surface 1012*b* and the variable part 151*b* of the display may be disposed to be adjacent in the first direction without overlapping each other. When the second rear surface 1012*b* and the display 151 overlap each other, the second rear surface 1012*b* is supposed to be inserted into the mobile terminal 100 by the sum of thicknesses of the display 151, the rolling hinge 104, and the second rear portion 1022.

In this case, a mounting space inside the first frame 101 may be reduced and a great step may be formed between the first rear surface 1012*a* and the second rear surface 1012*b*. this may cause the user to feel uncomfortable when gripping the expanded mobile terminal 100.

Therefore, in the present disclosure, the display 151 and the second rear portion 1022 may be disposed up and down and a portion externally exposed by being expanded in the second state and a portion where the display 151 is located in the first state may be separated from each other in the first direction.

An extension portion of the rear cover 1025 that covers the second rear surface 1012*a* in the first state covers internal components that are exposed as the second rear portion 1022 moves in the second state. The second rear surface may cover the rear surface of the first frame 101 exposed in response to the movement of the rear cover 1025. A length of the second rear surface 1012*a* in the first direction may be longer than or equal to a movement distance of the second frame 102.

The mobile terminal 100 according to the present disclosure may include the frames 101 and 102 in which components are mounted, and the frames 101 and 102 may vary in size in the first direction, as illustrated in FIG. 2. At least one of the frames 101 and 102 may relatively move so as to change in size in the first direction. The frames 101 and 102 has electronic components mounted inside thereof and the flexible display disposed outside.

Since the mobile terminal 100 includes the flexible display 151, the flexible display 151 may be coupled in a manner of covering the front surface and the rear surface of the frames 101 and 102. The frames may include the first frame 101 and the second frame 102 moving relative to the first frame 101 in the first direction. The first frame 101 and the second frame 102 each include a front portion, a rear portion, and side portions, which are coupled all together.

First, the first frame 101 may correspond to a main body of the mobile terminal 100, and define a space between the first front portion 1011 and the first rear surface 1012*a* for accommodating various components. Also, the first frame 101 may accommodate the second frame 102, which is movably coupled to the first frame 101, in the space. In more detail, the first frame 101 may include the first front portion 1011 disposed on the front of the mobile terminal 100 to support the front surface portion of the display 151, and the first rear surface 1012 disposed on the rear of the mobile terminal to mount various components thereon.

The first front portion 1011 and the first rear portion 1012 may be spaced apart from each other by a predetermined gap to define a predetermined space, and may be connected by the first side portion 1013. The first side portion 1013 may also be formed integrally with the first rear portion 1012 or the first front portion 1011. The camera 121, the audio output module 152, the input/output terminal, and the controller 180 which are components of the mobile terminal 100 may be accommodated in the inner space of the first frame 101. For example, the controller 180 may be a main substrate 181 that includes a processor, and an electronic circuit for controlling operations of the mobile terminal 100.

The battery 191 as the power supply unit 190 occupies the largest region of the mobile terminal 100. As the number of components of the mobile terminal 100 increases and a usage time of the display 151 extends, the capacity of the battery 191 becomes important. Accordingly, even if other components are reduced in size, the battery 191 is getting larger. Since the weight of the battery 191 as well as the occupied space increases, the center of gravity of the mobile terminal 100 may change depending on the position of the battery 191.

As illustrated in FIG. 4C, in the embodiment of the present disclosure, the battery 191 may be disposed on the second frame 102, thereby minimizing the shift of the center of gravity when the mobile terminal 100 is expanded. When the battery 191 is mounted on the first frame 101, the center of gravity is almost similar to a sliding distance of the frames 101 and 102. However, in the embodiment of the present disclosure, the weight of the battery 191 may be distributed to the first frame 101 and the second frame 102, such that the center of gravity can be located in a middle portion in the expanded state. As illustrated in the embodiment of FIG. 4A, when the battery 191 is located in the first frame 101, the inner space of the second frame 102 becomes empty in the expanded state of the mobile terminal 100. This causes a problem of weak support force for the rear surface of the variable part 151*b*. The support bars of the rolling hinge 104 located on the rear surface of the variable part 151*b* and the second front portion 1021 can support the variable part 151*b*, but the support force may be limitedly applied. This may cause bending deformation when strong force is applied to the front surface.

Also, the battery 191 may be disposed between the second front portion 1021 and the second rear portion 1022 of the second frame 102 so as to support the rear surface of the variable part 151*b* which has moved to the front surface of the mobile terminal 100. When the battery 191 is located on the rear surface of the second front portion 1021, the variable part 151*b* moved to the front may be maintained in the flat state.

Referring to FIGS. 3B and 4D, the side portion of the first frame 101 may include a first side surface 1013*a* that is always exposed, and a second side surface 1013*b* that is selectively exposed. The second side portion 1023 defining the side surface of the second frame 102 covers the second side surface 1013*b* in the first state, and exposes the second side surface 1013*b* in the second state.

The second side surface 1013*b* may be located only in a portion which is externally exposed in the second state, and an overlap section between the second side surface 1013*b* and the second side portion 1023 of the second frame 102 can be minimized.

In the inner space of the second side portion 1023 which does not overlap the second side surface 1013*b*, guide rails 231 and 232 for guiding the sliding motion of the frames 101 and 102, auxiliary substrates 183*a* and 183*b* connected to components of the second frame 102, or the like may be disposed. The first side surface 1013*a* and the second side surface 1013*b* are located between the first front portion 1011 and the first and second rear surfaces 1012*a* and 1012*b*, to define the inner space of the first frame 101. Here, since the first side surface 1013*a* is always externally exposed, antennas and the like can be implemented. A SIM card tray insertion hole 162 which does not have to be always exposed may be disposed in the second side surface 1013*b*.

The second side portion 1023 may define a component mounting space therein together with the second front portion 1021 and the second rear portion 1022, and define appearance of the mobile terminal 100 together with the rear cover 1025. The second side portion 1023, as illustrated in FIG. 3A, may have the same height as the rear cover 1025. A front bezel 1014 that covers a front periphery of the display 151 may further be provided. The front bezel 1014 fixes the end portion of the display 151 to the first frame 101 and the second frame 102.

The front bezel 1014 may include a first bezel adjacent to the first side surface 1013a of the first frame, and a second bezel adjacent to the second side portion 1023 of the second frame. The first bezel and the second bezel may be connected in the first state as illustrated in (a) of FIG. 3A, and disconnected in the second state as illustrated in (b) of FIG. 3B.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to the related art radio access technology. In addition, massive MTC (Machine Type Communications), which connects a plurality of devices and objects to provide various services anytime and anywhere, is also one of major issues to be considered in next-generation communication. Furthermore, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, terminals operating with different numerologies may coexist in a single cell.

In this regard, in the case of 4G LTE, since the maximum bandwidth of the system is limited to 20 MHz, a single sub-carrier spacing (SCS) of 15 kHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. Different numerologies may be defined by scaling a reference subcarrier spacing with an integer N. In this regard, FIG. 5A shows an example of a frame structure in NR. FIG. 5B shows a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N (or μ). Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| m | $\Delta f = 2^\mu *$ 15 [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher.

The NR frequency band is defined as a frequency range of two types (FR1, FR2). The FR1 is a sub-6 GHz range, and the FR2 is a range of above 6 GHz, which may denote millimeter waves (mmWs).

Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One subframe={1,2,4} slots shown in FIG. 3 is an example, in which the number of slot(s) that can be included in one subframe may be one, two or four. In addition, a mini-slot may include two, four, or seven symbols or may include more or fewer symbols.

Referring to FIG. 5B, a subcarrier spacing of 5G NR phase I and a length of an OFDM symbol corresponding to the spacing are shown. Each subcarrier spacing is extended by a multiplier of two, and the symbol length is inversely reduced. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 3A or 3B regardless of the subcarrier spacing. Referring to FIG. 3A, when a wide subcarrier spacing is used, the length of one slot may decrease in inverse proportion to the subcarrier spacing, thereby reducing transmission delay in a wireless section. In addition, in order to efficiently support ultra-reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that of 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 kHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G Sub-6 antenna. Meanwhile, the FR1 band signal received through the 5G Sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency-converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 2B will be discussed below.

Figure 6A:
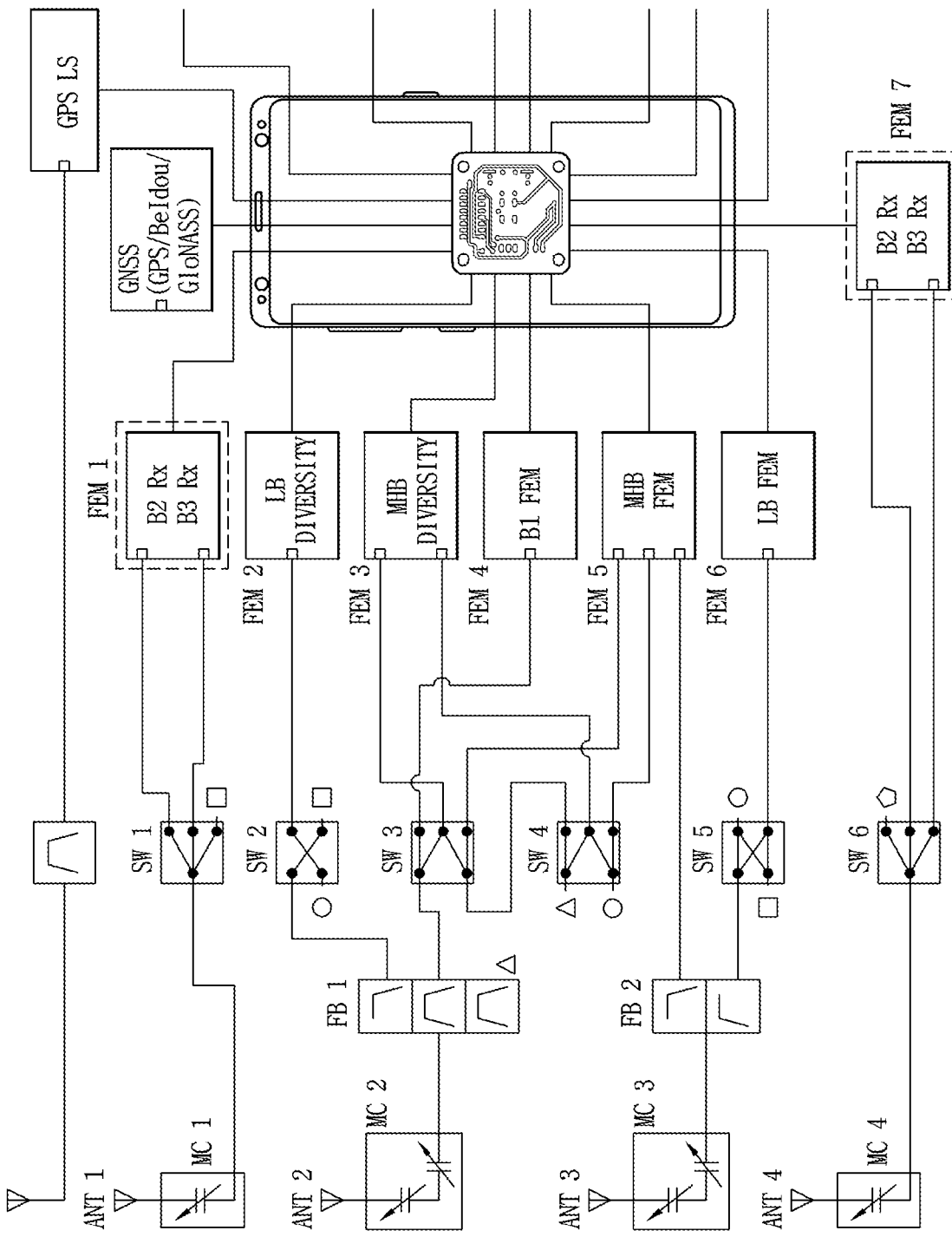
FIG. 6A is a view illustrating a configuration in which a plurality of antennas and transceiver circuits according to an embodiment are operably coupled to a processor.
Figure 6B:
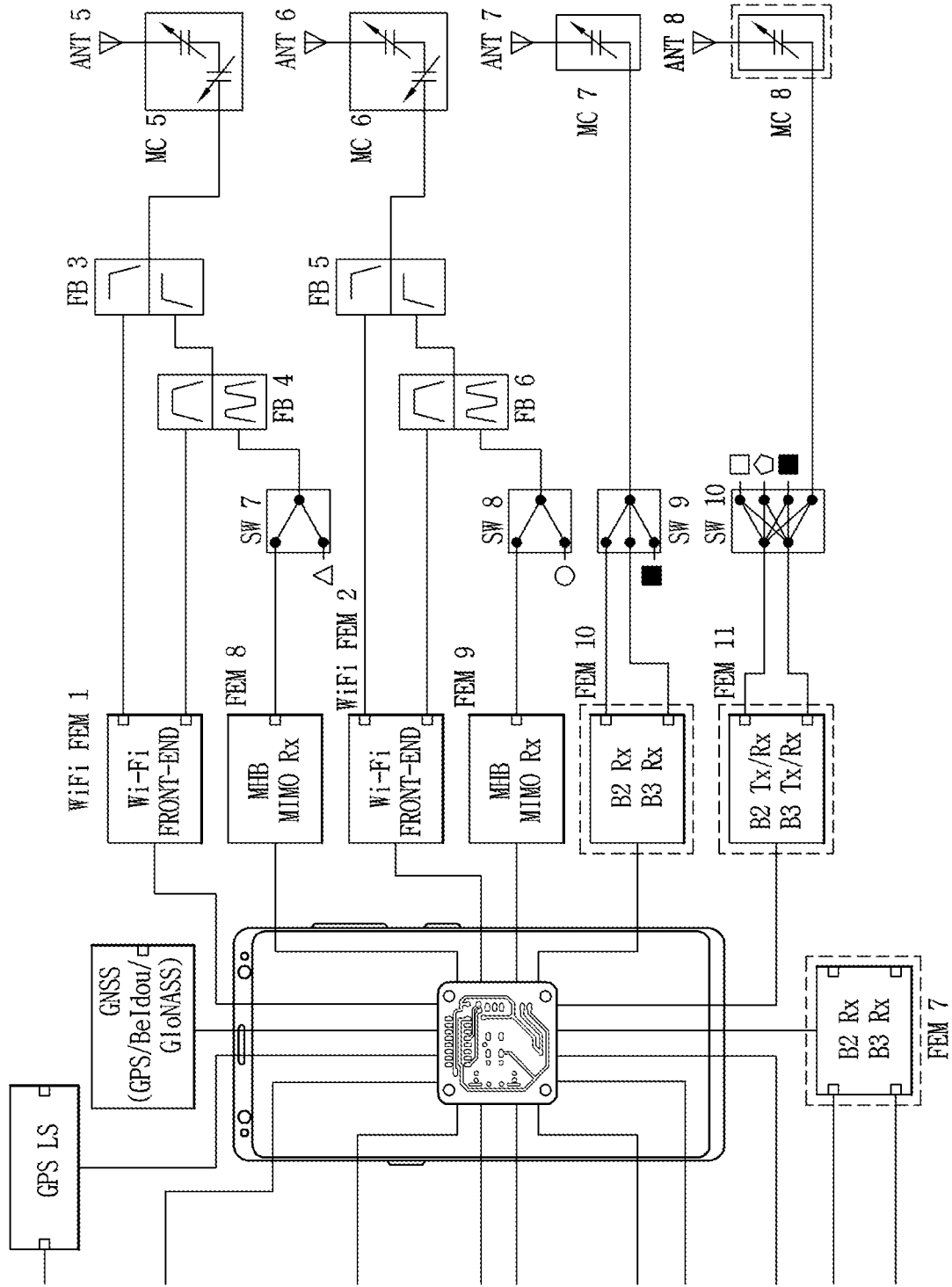
FIG. 6B is a diagram illustrating a configuration in which antennas and transceiver circuits are additionally operably coupled to a processor in the configuration of FIG. 6A.

In a 5G communication system according to an embodiment, the 5G frequency band may be a Sub-6 band. In this regard, FIG. 6A is a configuration diagram in which a plurality of antennas and transceiver circuits according to an embodiment are coupled to a processor in an operable manner. FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front end modules FEM1 to FEM7 operating in a 4G band and/or a 5G band. In this regard, a plurality of switches SW1 to SW6 may be arranged between the plurality of antennas ANT1 to ANT4 and the front end modules FEM1 to FEM7.

Referring to FIGS. 6A and 6B, the electronic device may include a plurality of antennas ANT5 to ANT8 and front end modules FEM8 to FEM11 operating in a 4G band and/or a 5G band. In this regard, a plurality of switches SW7 to SW10 may be arranged between the plurality of antennas ANT1 to ANT4 and the front end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna as well as a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

For an example, the eighth antenna ANT2 may be configured to transmit and/or receive signals in the 4G band and/or the 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate in a low band LB. In addition, the second antenna ANT2 may be configured to operate in a mid-band MB and/or a high band HB. Here, the middle band MB and high band HB may be referred to as MHB.

A first output of the first filter bank FB1 connected to the second antenna ANT2 may be connected to the second switch SW2. Meanwhile, a second output of the first filter bank (FB1) connected to the second antenna (ANT2) may be connected to the third switch (SW3). Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the sixth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the sixth antenna ANT5 may be configured to receive the WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor 1400 may control antennas and the transceiver circuit 1250 to perform multi-input and multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. In another example, the baseband processor 1400 may perform MIMO through the second antenna ANT2 and the sixth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna as well as a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor that varies a capacitance by varying a voltage.

On the contrary, when operating in spaced bands such as the second antenna ANT2, the third antenna ANT3, the fifth antenna ANT5, and the sixth antenna ANT6, only two or more variable elements may be used. In this case, two or more variable elements may be two or more variable capacitors or a combination of a variable inductor and a variable capacitor.

Referring to FIGS. 2B, 6A, and 6B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT1, and the eighth antenna ANT8 in the third band B3. Therefore, the baseband processor 1400 may control the plurality of antennas and the transceiver circuit 1250 to support MIMO up to 4RX as well as 2RX in the 5G band.

Figure 7A:
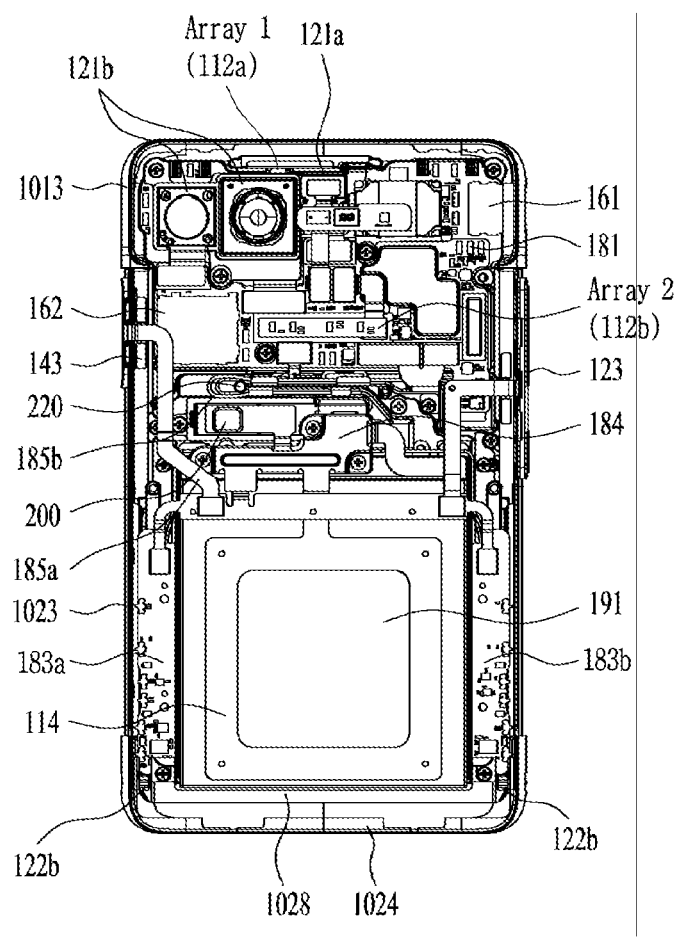
FIGS. 7A and 7B are views illustrating internal components in a first state and a second state of a mobile terminal 100.
Figure 7B:
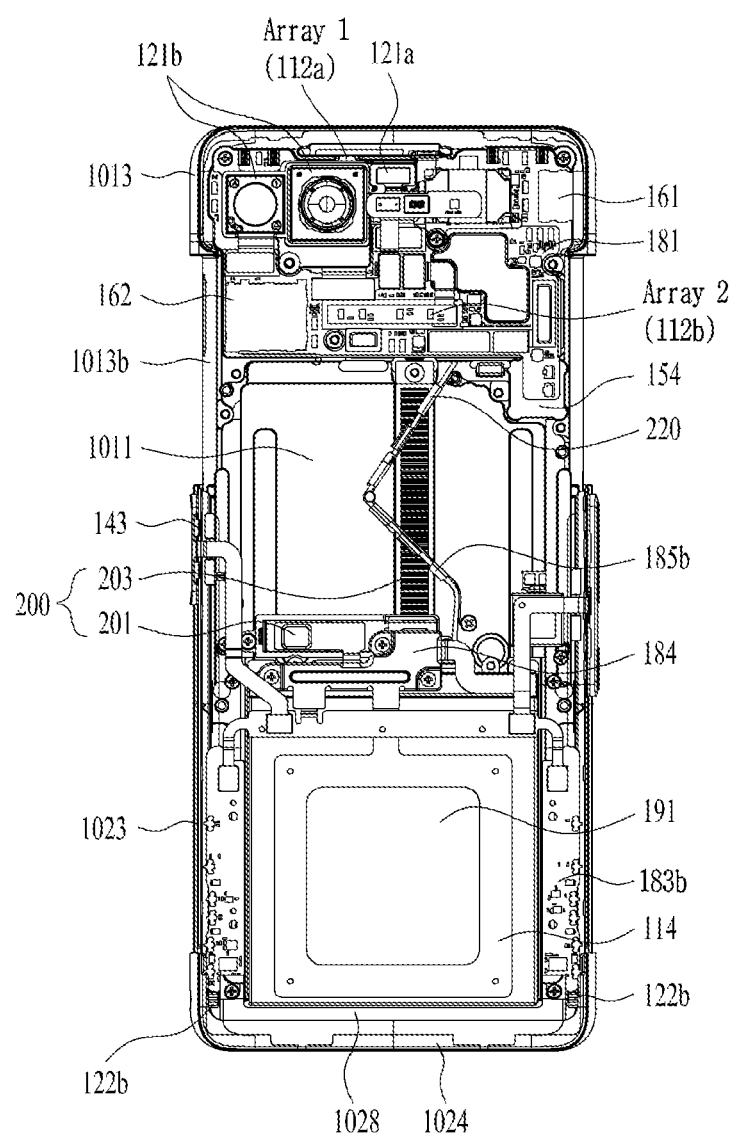

FIGS. 7A and 7B are views illustrating internal components in the first state and the second state of the mobile terminal 100. FIGS. 7A and 7B illustrate the internal components by removing the rear portions 1012 and 1022 and the rear cover 125 covering the display 151 and the rear surface of the mobile terminal 100. FIG. 7A shows the first state and FIG. 7B shows the second state. The main substrate 181, the battery 191, the cameras 121a and 121b, the vibration module 154, the microphone 122a, the audio output module 152, the rack gear 203 of the driving unit 200, and the like are mounted on the first frame 101. The battery 191, the user input unit, the coil antenna 114, the mobile communication antenna 112, the microphone 122b, and the motor 201 and a pinion gear (not shown) of the driving unit 200 may be mounted on the second frame 102.

The main substrate 181 may be located on the first frame 101, and the cameras 121a and 121b, the vibration module 154, and the interface units 161 and 162 may be mounted on the main substrate 181. The cameras may include a main camera 121b facing the rear surface of the mobile terminal 100, and a camera 121a facing the front surface of the mobile terminal 100. To dispose the front camera 121a, an area that is partially deactivated may be included in the upper end of the display 151. Meanwhile, antennas 112a and 112b and the like may be disposed on the main substrate 181 or a separate substrate.

A cable terminal 161 for charging or data transmission may be located on the first side surface 1013a to be used even in the first state of the mobile terminal 100. A card mounting unit 162 for mounting a USIM or memory card is not usually used, and thus may be disposed adjacent to the second side surface 1013b which is open only in the second state.

A plurality of mobile communication antennas may be implemented using the first side surface 1013a. Meanwhile, array antennas 112a and 112b for mmWave signals may be disposed in different regions of the mobile terminal 100. The array antennas 112a and 112b may be disposed to face the upper end and the rear surface of the mobile terminal, respectively. Accordingly, beams may be radiated from the array antennas 112a and 112b toward the upper portion and the rear surface of the mobile terminal, respectively.

The driving unit 200 which applies sliding force between the first frame 101 and the second frame 102 includes a driving motor 201, a pinion gear (not shown) that rotates by rotational force supplied from the driving motor 201, and a rack gear 203 engaged with the pinion gear to perform a linear motion. The driving motor 201 and the rack gear 203 may be coupled to different frames. The driving motor 201 according to the embodiment may be located in the second frame 102 and the rack gear 203 on the pinion gear, but they may be disposed in an opposite way.

However, since the user grips the second frame 102, the driving motor 201 may be more stably driven when it is located in the second frame 102 than when located in the first frame 101.

The driving unit 200 may be located above the battery 191 to minimize the length of the short rack gear 203 and enable a stable sliding motion. Since the driving unit 200 located above the battery 191 guides the sliding motion at a central portion of the mobile terminal 100 in the first direction, driving force can be stably transferred without being biased to one side.

The rack gear 203, referring to FIG. 7B, is also located adjacent to the central portion of the mobile terminal 100 in the third direction, so as to enable the stable sliding motion of the frames 101 and 102 without being inclined when the frames 101 and 102 slide.

The rack gear 203 of the driving unit 200 may be disposed on the rear surface of the first front portion 1011 to face the rear surface of the mobile terminal 100. The second frame 102 may include a slot that is formed in the first front portion 1011 to extend in the first direction to a position corresponding to the rack gear 203. Thus, the rack gear 203 can be located in the slot in the first state. The rack gear 203 may overlap the battery 191, which is mounted to the second frame 102, in the first state. In the second state, the rack gear 203 may move in the second direction along the first frame 101 and extend to be located in an empty space.

In the embodiment of the present disclosure, the components are dispersively mounted in the first frame 101 and the second frame 102, which is advantageous in that the center of gravity is stable and the battery 191 supports the variable part 151b of the display. However, there is a need of a signal connection part 185b for connecting the component mounted in the first frame 101 and the component mounted in the second frame 102. The signal connection part 185b may include an electrical signal and power source of the battery 191, and may be made of a material that is deformable in response to the movement of the frames.

The signal connection part 185b may be constituted by using a flexible printed circuit board (FPCB) or a coaxial cable. Since antenna signals cause noise when affected by external impact, a coated coaxial cable may be used.

The signal connection part 185b may be bent between the first frame 101 and the second frame 102. When the FPCB or coaxial cable is bent in a thickness direction of the mobile terminal 100 in the first state, a curvature of a bent portion may be small. Also, when a position of the bent portion changes in response to the movement of the frame, it may cause a problem in view of durability.

Therefore, the signal connection part 185b according to the present disclosure may be disposed to be overlaid in the first direction of the mobile terminal 100 in the first state, and the bent portion of the signal connection part may become open in the second state and a bent angle of the bent portion may change.

Meanwhile, the electronic device of FIGS. 7A and 7B may be a terminal that changes in size as any one frame moves relative to another frame in different directions. The electronic device may be switched to an expanded state (first state) that the size thereof increases, and a retracted/reduced state (second state) that the size decreases/is reduced. In the expanded state (first state) of the electronic device, a specific module may be externally exposed or the display may extend. For example, in the expanded state (first state), a partial region of the display may be externally exposed.

In this regard, the display may include a first region 151*a* that is exposed to the front surface in the retracted state, and a second region 151*b* that is an expanded region exposed to the front surface in the expanded state. Specifically, the display 151 includes a fixed part 151*a* that is fixed to the front surface of the first frame 101 and always located on the front surface of the mobile terminal 100 regardless of the state of the mobile terminal 100. The display 151 further includes a variable part 151*b* that is located on the front surface or the rear surface depending on whether or not the mobile terminal 100 is expanded. The fixed part 151*a* and the variable part 151*b* may be referred to as the first region 151*a* and the second region 151*b*, respectively.

In the retracted/reduced state (second state), the first region 151*a* corresponding to the fixed part 151*a* may be exposed to the front surface of the rollable device. Accordingly, a mode in which the first region 151*a* is exposed to the front surface of the rollable device may be referred to as a first mode (basic mode). Also, in the expanded state (first state), the first region 151*a* and the second region 151*b* corresponding to the fixed part 151*a* and the variable part 151*b* may be exposed to the front surface of the rollable device. Accordingly, a mode in which the first region 151*a* and the second region 151*b* are exposed to the front surface of the rollable device may be referred to as a second mode (expansion mode).

Hereinafter, detailed operations and functions of the mobile terminal (electronic device), which has a plurality of antennas and changes in size, according to an embodiment provided with a multi-transceiving system as illustrated in FIGS. 2B, 6A, and 6B will be described.

Figure 8A:
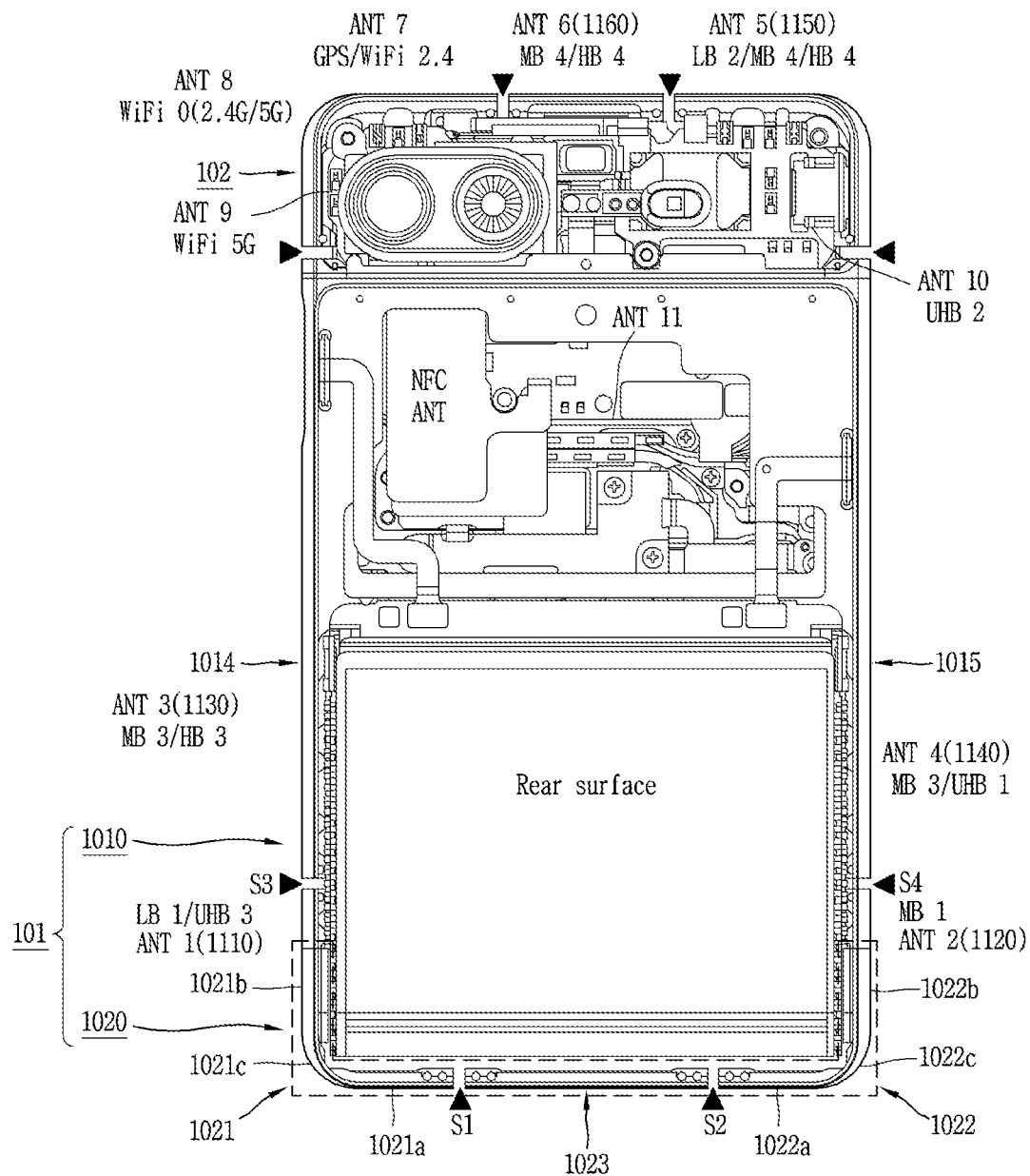
FIG. 8A illustrates a structure in which a plurality of antennas are disposed on metal rims of an electronic device.

In this regard, FIG. 8A illustrates a structure in which a plurality of antennas are disposed on metal rims of an electronic device. Specifically, FIG. 8A shows a structure in which a plurality of LTE/5G Sub6 antennas and WiFi antennas are disposed on the metal rims of the electronic device. A plurality of mmWave antenna modules (see FIGS. 7A and 7B) may be disposed inside the electronic device.

Referring to FIGS. 7A and 8A, the mode in which the first region 151*a* is exposed to the front surface of the rollable device may be referred to as a closed state because the first frame 101 is coupled to the second frame 102 in the first mode (basic mode). Referring to FIGS. 7B and 8A, the mode in which the first region 151*a* and the second region 151*b* are exposed to the front surface of the rollable device may be referred to as an open state because the first frame 101 is spaced apart from the second frame 102 by a predetermined distance in the second mode (expansion mode).

Figure 8B:
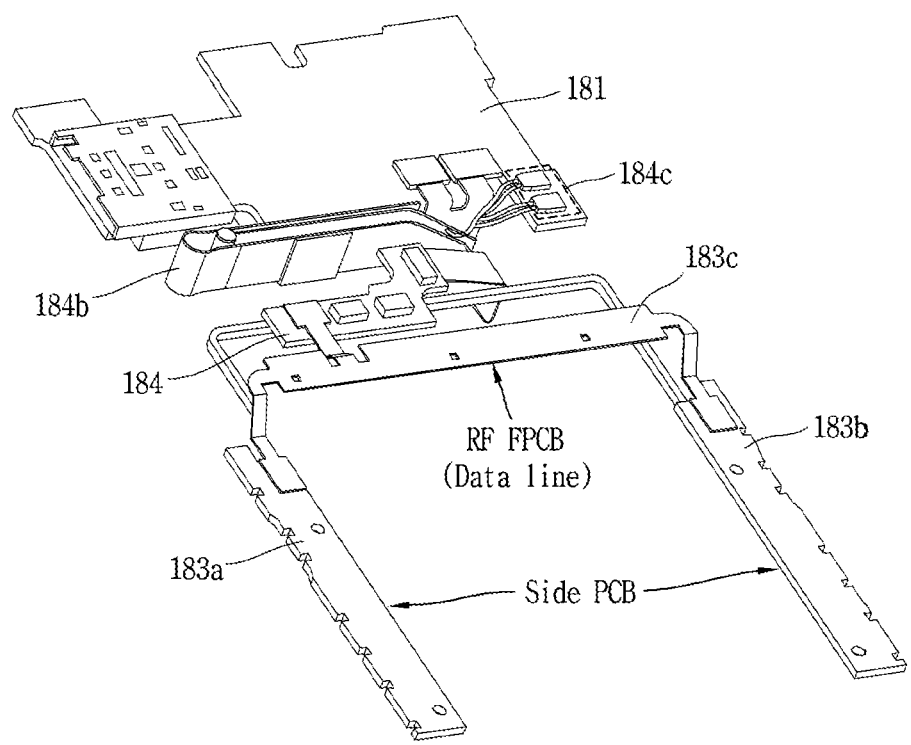
FIG. 8B illustrates a configuration in which side PCBs disposed in the present disclosure are connected to a main PCB through an FPCB and an auxiliary PCB.
Figure 9A:
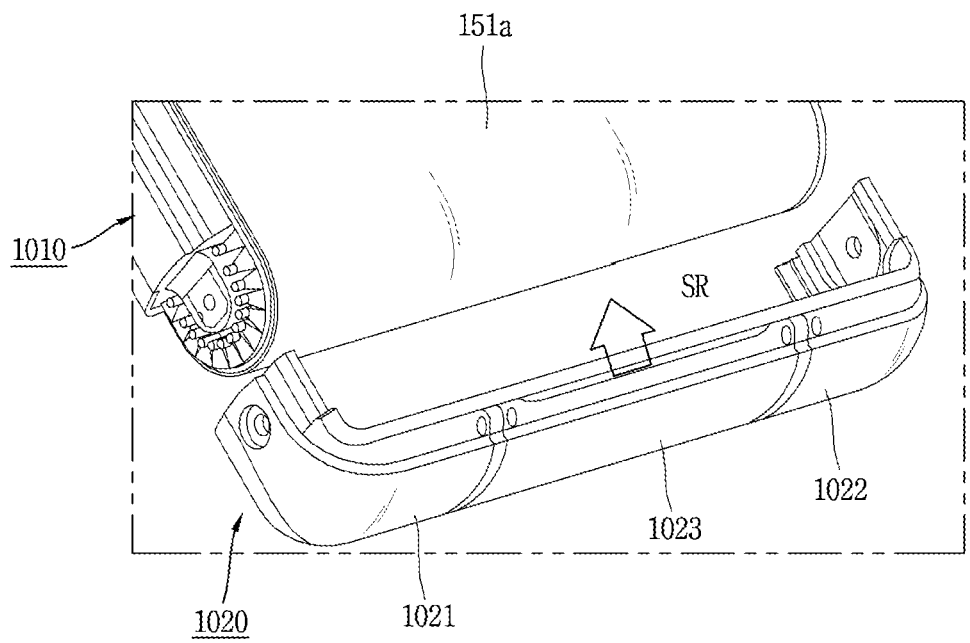
FIG. 9A illustrates a bottom metal rim and side metal rims disposed on the bottom of a display that is rolled by a rolling unit.
Figure 9B:
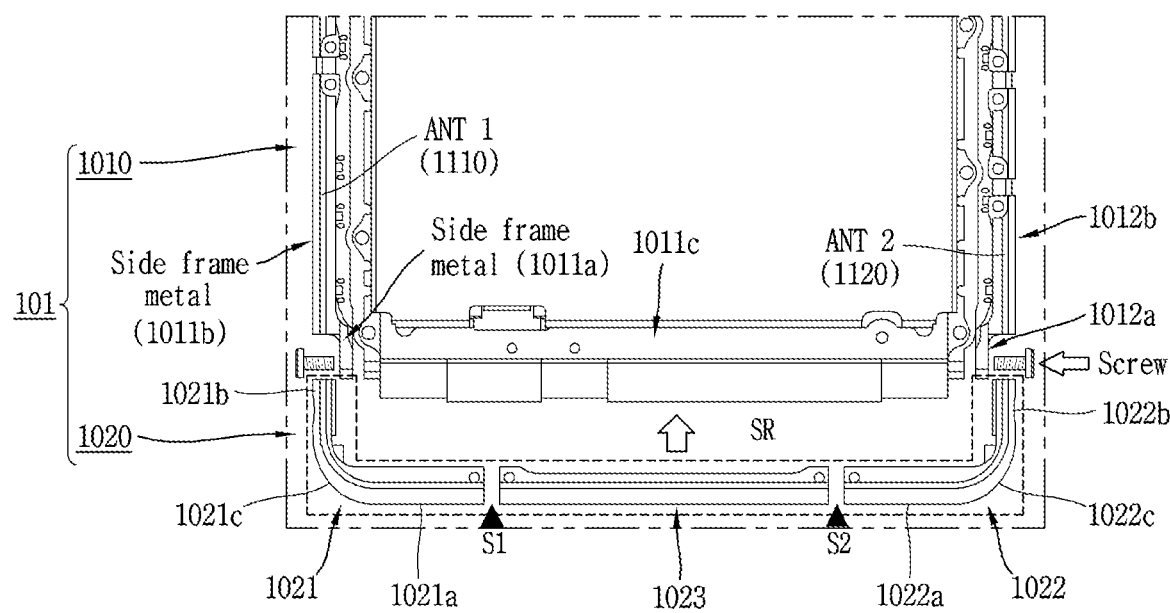
FIG. 9B illustrates a plurality of antennas disposed on a lower portion and side surfaces of the electronic device of FIG. 8A.

FIG. 8B illustrates a configuration in which side PCBs disclosed in the present disclosure are connected to a main PCB through an FPCB and an auxiliary PCB. Meanwhile, FIG. 9A illustrates a bottom metal rim and side metal rims disposed on the bottom of the display that is rollable by a rolling unit. FIG. 9B illustrates a plurality of antennas disposed on the bottom and side surfaces of the electronic device of FIG. 8A. In this regard, in FIGS. 8A to 9B, the electronic device may be an electronic device according to various form factors.

A plurality of antennas include a first antenna ANT1 and a second antenna ANT2 disposed on the bottom (lower portion) of the mobile terminal. In this regard, the first antenna ANT1 and the second antenna ANT2 are not limited to being disposed on the bottom. For example, antennas disposed on the top (upper portion) of the electronic device may alternatively be referred to as the first antenna ANT1 and the second antenna ANT2. Therefore, the first antenna ANT1 and the second antenna ANT2 may be referred to as lower side antennas. The first antenna ANT1 and the second antenna ANT2 may be disposed on one side and another side of the second metal housing 1020, respectively. Also, partial regions of the first antenna ANT1 and the second antenna ANT2 may be disposed on one side and another side of the first metal housing 1010, respectively.

Referring to FIGS. 8A to 9B, the plurality of antennas may include the first antenna (ANT1) 1110 and the second antenna (ANT2) 1120 disposed on the bottom and side surfaces of the mobile terminal. Also, the plurality of antennas may further include a third antenna (ANT3) 1130 and a fourth antenna (ANT4) 1140 disposed on the side surfaces of the mobile terminal. Therefore, the first antenna ANT1 to the fourth antenna ANT4 may also be referred to as lower side antennas.

Also, the plurality of antennas further include a fifth antenna ANT5 to an eighth antenna ANT8 disposed on the top of the mobile terminal. Therefore, the fifth antenna ANT5 to the eighth antenna ANT8 may also be referred to as upper side antennas. Also, the plurality of antennas further include a ninth antenna ANT5 to an eleventh antenna ANT11 disposed inside the mobile terminal.

The first antenna ANT1 may be configured to operate in a low band (LB) and an ultra-high band (UHB) of the LTE/5G band. The second antenna ANT2 may be configured to operate in a mid-band (MB) and a high band (HB) of the LTE/5G band. Therefore, the first antenna ANT1 may be configured to transmit and/or receive at least one of LB and UHB signals of the LTE/5G band. The second antenna ANT2 may be configured to transmit and/or receive at least one of MB and HB signals.

The third antenna ANT3 may be configured to operate in MB and HB of the LTE/5G band. The fourth antenna ANT4 may be configured to operate in HB and UHB of the LTE/5G band. Therefore, the third antenna ANT3 may be configured to transmit and/or receive at least one of MB and HB signals of the LTE/5G band. The fourth antenna ANT4 may be configured to transmit and/or receive at least one of HB and UHB signals of the LTE/5G band. Therefore, MIMO operation may be performed by using two or more of the first antenna (ANT1) 1110 to the fourth antenna (ANT4) 1140 disposed on the bottom and the side surfaces of the mobile terminal. On the other hand, carrier aggregation (CA) operation may be performed by using at least one of the first antenna (ANT1) 1110 to the fourth antenna (ANT4) 1140 disposed on the bottom and the side surfaces of the mobile terminal. Also, MIMO+CA operation may be performed by using two or more of the first antenna (ANT1) 1110 to the fourth antenna (ANT4) 1140 disposed on the bottom and the side surfaces of the mobile terminal.

The fifth antenna ANT5 may be configured to operate in LB, MB, and HB of the LTE/5G band. The sixth antenna ANT6 may be configured to operate in MB and HB of the LTE/5G band. Therefore, the fifth antenna ANT5 may be configured to transmit and/or receive at least one of LB, MB, and HB signals of the LTE/5G band. The sixth antenna ANT6 may be configured to transmit and/or receive at least one of MB and HB signals of the LTE/5G band. Therefore, MIMO operation may be performed by using the fifth antenna (ANT5) 1150 and the sixth antenna (ANT6) 1160 disposed on the top and the side surfaces of the mobile terminal. On the other hand, CA operation may be performed by using at least one of the fifth antenna (ANT5)

1150 and the sixth antenna (ANT6) 1160 disposed on the top and the side surfaces of the mobile terminal. Therefore, MIMO+CA operation may be performed by using the fifth antenna (ANT5) 1150 and the sixth antenna (ANT6) 1160 disposed on the top and the side surfaces of the mobile terminal.

In another embodiment, MIMO operation may be performed by using two or more of the first antenna (ANT1) 1110 to the sixth antenna (ANT6) 1160 disposed on different regions (top, bottom, side surfaces) of the mobile terminal. On the other hand, CA operation may be performed by using at least one of the first antenna (ANT1) 1110 to the sixth antenna (ANT6) 1160 disposed on the bottom and the side surfaces of the mobile terminal. Also, MIMO+CA operation may be performed by using two or more of the first antenna (ANT1) 1110 to the sixth antenna (ANT6) 1160 disposed on the bottom and the side surfaces of the mobile terminal.

On the other hand, the seventh antenna ANT7 may operate as a GPS/WiFi antenna. The eighth antenna ANT8 may be configured to operate in a WiFi band. Specifically, the eighth antenna ANT8 may be configured to operate in WiFi bands of a first band and a second band. In this regard, the first band and the second band may be 2.4 GHz and 5 GHz bands, respectively, but are not limited thereto, and may be different WiFi bands. WiFi MIMO operation may be performed in the first band using the seventh antenna ANT7 and the eighth antenna ANT8.

The ninth antenna ANT9 disposed inside the mobile terminal may be configured to operate in a WiFi band. Specifically, the ninth antenna ANT9 may be configured to operate in a WiFi band of the second band. WiFi MIMO operation may be performed in the second band using the eighth antenna ANT8 and the ninth antenna ANT9.

On the other hand, the tenth antenna ANT10 disposed inside the mobile terminal may be configured to operate in UHB of the LTE/5G band. The eleventh antenna ANT11 disposed inside the mobile terminal may be configured to operate in UHB of the LTE/5G band. Therefore, the tenth antenna ANT10 may be configured to transmit and/or receive at least one of UHB signals of the LTE/5G band. The eleventh antenna ANT11 may also be configured to operate in UHB of the LTE/5G band.

Therefore, MIMO operation may perform using two or more of the first antenna (ANT1) 1110, the fourth antenna (ANT4) 1140, the tenth antenna ANT10, and the eleventh antenna ANT11 that operate in UHB. Therefore, CA operation may perform using at least one of the first antenna (ANT1) 1110, the fourth antenna (ANT4) 1140, the tenth antenna ANT10, and the eleventh antenna ANT11 that operate in UHB. Also, MIMO+CA operation may perform using two or more of the first antenna (ANT1) 1110, the fourth antenna (ANT4) 1140, the tenth antenna ANT10, and the eleventh antenna ANT11 that operate in UHB.

Referring to FIGS. 7A, 7B, and 8A, the plurality of mmWave band antenna modules may be disposed on the side surfaces of the mobile terminal and/or inside the mobile terminal. The plurality of mmWave band antenna modules may include a first array antenna (ARRAY1) 112a and a second array antenna (ARRAY2) 112b. The first array antenna (ARRAY1) 112a and the second array antenna (ARRAY2) 112b may be disposed on a side surface of the electronic device and inside the electronic device, such that antenna elements can be disposed to radiate signals toward the side surface and the rear surface. For example, the first array antenna (ARRAY1) 112a and the second array antenna (ARRAY2) 112b may be disposed on an upper side surface of the electronic device and inside the electronic device, respectively, to radiate signals toward the upper side surface and the rear surface.

In the first array antenna (ARRAY1) 112a and the second array antenna (ARRAY2) 112b, the plurality of antenna elements may be spaced at predetermined distances. Beamforming may be performed by controlling phases of signals applied to the respective antenna elements disposed at the predetermined distances. An optimal antenna may be selected from the first array antenna (ARRAY1) 112a and the second array antenna (ARRAY2) 112b, and beamforming may be performed through the selected array antenna. As another embodiment, MIMO or diversity may be performed using both the first array antenna (ARRAY1) 112 and the second array antenna (ARRAY2) 112b.

In this regard, electronic devices may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate. Meanwhile, an electronic device supporting 4G and 5G communication services may be provided in various form factors. As an example of the form factors for the electronic device, a rollable device may be considered. In the rollable device which changes in size, wireless performance deviation may occur between a retracted state (first state) and an expanded state (second state).

Therefore, the present disclosure proposes a plurality of antenna structures disposed on a metal housing of a mobile terminal, capable of minimizing wireless performance deviation between a retracted state (first state) and an expanded state (second state). Referring to FIG. 8A to FIG. 9B, the plurality of antennas may be disposed on the metal housing of the mobile terminal that changes in size. Referring to FIGS. 7A to 9B, the mobile terminal that vertically changes in size may be referred to as a vertically rollable device. However, the retraction/expansion of the rollable device may not be limited to the vertical direction but the size may alternatively change horizontally.

Referring to FIGS. 7A to 9B, the size-variable mobile terminal may include a plurality of metal housings. The plurality of metal housings may include a first metal housing 1010 and a second metal housing 1020. The first metal housing 1010 and the second metal housing 1020 may also be referred to as the first frame 101. The first metal housing 1010 may include a left side surface and a right side surface defining appearance of the mobile terminal. The second metal housing 1020 may include a left side surface, a right side surface, and a bottom side surface defining the appearance.

A first conductive member 1021 and a second conductive member 1022 of the second metal housing 1020 may include a first sub member disposed on a bottom side surface, and a second sub member disposed on the left side surface or the right side surface. The first conductive member 1021 of the second metal housing 1020 may include a first sub member 1021a disposed on the bottom side surface, and a second sub member 1021b disposed on the left side surface. The second conductive member 1022 of the second metal housing 1020 may include a first sub member 1022a disposed on the bottom side surface, and a second sub member 1022b disposed on the left side surface.

Specifically, the first conductive member 1021 may include the first sub member 1021a, the second sub member 1021b, and a first corner region 1021c. The first sub member 1021a may be disposed on a first part (one side) of a lower side of the second metal housing 1020. The second sub member 1021b may be disposed on a first side surface of the second metal housing 1010. The first corner region 1021c may be a sub member that is formed at a predetermined curvature between the first sub member 1021a and the second sub member 1021b. Meanwhile, the first metal housing 1010 that overlaps the first conductive member 1021 may operate as the first antenna (ANT1) 1110.

The second conductive member 1022 may include the first sub member 1022a, the second sub member 1022b, and a first corner region 1022c. The first sub member 1022a may be disposed on a second part (another side) of the lower side of the second metal housing 1020. The second sub member 1022b may be disposed on a second side surface of the second metal housing 1020. The second corner region 1022c may be a sub member that is formed at a predetermined curvature between the first sub member 1022a and the second sub member 1022b. Meanwhile, the first metal housing 1010 that overlaps the second conductive member 1022 may operate as the second antenna (ANT2) 1120.

A length of the first antenna (ANT1) 1110 may be longer than a length of the second antenna (ANT2) 1120 such that the first antenna (ANT1) 1110 operates even in LB of LTE/5G. To this end, a length of the first metal housing 1010 disposed on the first side surface may be longer than a length of the second metal housing 1020 disposed on the second side surface.

The second metal housing 1020 may further include a third conductive member 1023 disposed between the first conductive member 1021 and the second conductive member 1022. An end portion of the first conductive member 1021 and one end portion of the third conductive member 1023 may be spaced apart from each other by a first slit S1. An end portion of the second conductive member 1022 and another end portion of the third conductive member 1023 may be spaced apart from each other by a second slit S2. Resonating lengths of the first and second antennas ANT1 and ANT2 may be optimized by the third conductive member 1023 spaced apart from the first and second conductive members 1021 and 1022 by the first slit S1 and the second slit S2, thereby improving isolation characteristics. On the other hand, since the third conductive member 1023 is not used as an antenna, a bottom region of the mobile terminal can be used as a display region as much as possible. Also, since the third conductive member 1023 is not used as an antenna, the changes in antenna characteristics when gripping the mobile terminal can be minimized.

Referring to FIGS. 7A to 8B, the mobile terminal may include a main PCB 181. The mobile terminal may further include a plurality of PCB s 181 to 183b. The first to third PCB s 181 to 183b may be electrically connected (interfaced) with one another. For example, the first to third PCBs 181, 183a, and 183b may be interfaced with one another through an RF FPCB.

The first PCB 181 may include a wireless communication unit. Referring to FIG. 2B, the wireless communication unit may include at least one of power amplifiers 1210 and 1220, receiving amplifiers 1310 to 1340, an RFIC 1250, a model 1400, and an AP 1450. The second PCB 183a may be electrically connected to the first PCB 181. The third PCB 183b may be electrically connected to the second PCB 183a. The second PCB 183a and the third PCB 183b may be referred to as side PCBs because of being disposed on the side regions of the mobile terminal. The second PCB 183a and the third PCB 183B may be electrically connected through the RF FPCB, and the RF FPCB may be electrically connected to the first PCB 181.

Referring to FIG. 8B, the second and third PCBs 183a and 183b corresponding to the side PCBs may be electrically connected to the main PCB 181 through an FPCB 183c and an auxiliary PCB 184. The second and third PCBs 183a and 183b may be electrically connected to the auxiliary PCB 184 through the FPCB 183c. The auxiliary PCB 184 may be electrically connected to the second PCB 181 as the main PCB through a second FPCB 184b. For example, the auxiliary PCB 184 may be electrically connected to the second PCB 181 as the main PCB through a connection terminal of the second FPCB 184b and a coaxial cable 184c connected to the second FPCB 184c. Accordingly, the first to fourth antennas ANT1 to ANT4 of FIG. 8A interfaced with the second and third PCBs 183a and 183b may be interfaced with the wireless communication unit and/or the processor of the first PCB 181 through the FPCB. Therefore, the plurality of antennas ANT1 to ANT4 electrically connected to the second and third PCBs 183a and 183b corresponding to the side PCBs can be controlled through the wireless communication unit and/or the processor.

Referring to FIGS. 7A to 9B, the mobile terminal may include the display 151 which changes in size. The display 151 may include a first region 151a that is exposed to the front surface in the retracted state of the mobile terminal, and a second region 151b that is an expanded region exposed to the front surface in the expanded state of the mobile terminal. The first region 151a and the second region 151b may be referred to as the fixed part 151a and the variable part 151b.

Meanwhile, the left side surface of the first metal housing 1010 and the second sub member 1021b of the second metal housing 1020 may overlap each other. Specifically, the overlapped first metal housing 1010 may not be exposed externally and the second sub member 1021b may be exposed externally. The first metal housing 1010 and the second metal housing 1020 may be referred to as a side metal frame and a lower metal frame, respectively.

Accordingly, in the rollable device, a display space can be maximized by minimizing a lateral length of the first metal housing, and also an antenna length can be secured by the second metal housing 1020. As one example, if the lateral length of the first metal housing increases in the rollable device, the position of the rolling hinge 104 may change upwards, which may reduce the display region. On the other hand, if the lateral length of the first metal housing is reduced and an antenna is implemented only by the first metal housing in the rollable device, an antenna length may be reduced and antenna performance in LB may be deteriorated. Meanwhile, the slits S1 and S2 may be disposed at a central portion to increase the antenna length, but it may cause an issue that there is an insufficient space to dispose the PCBs in the lower region of the mobile terminal.

Figure 10A:
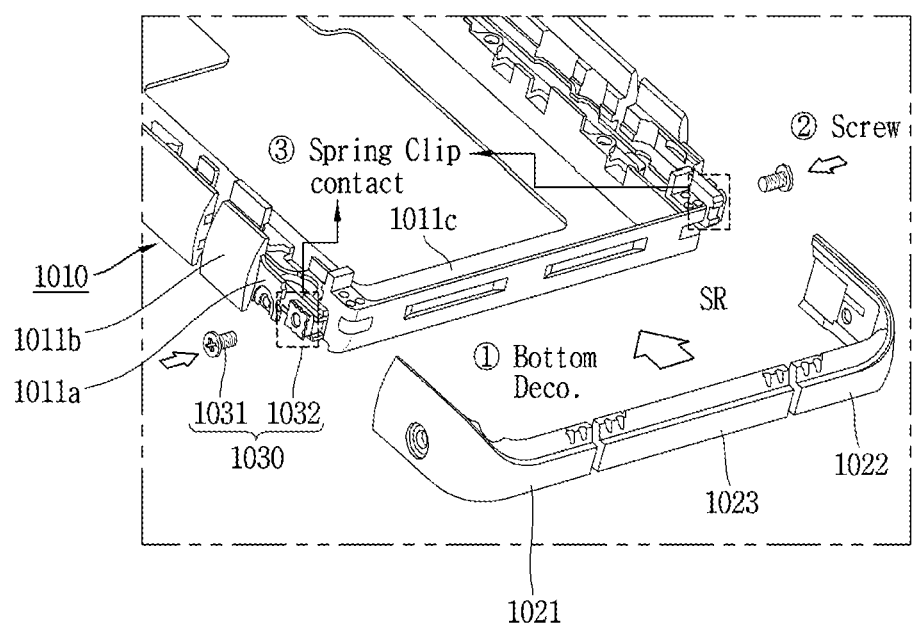
FIG. 10A illustrates a structure in which metal housings separately manufactured from each other are fastened to each other in accordance with one embodiment.
Figure 10B:
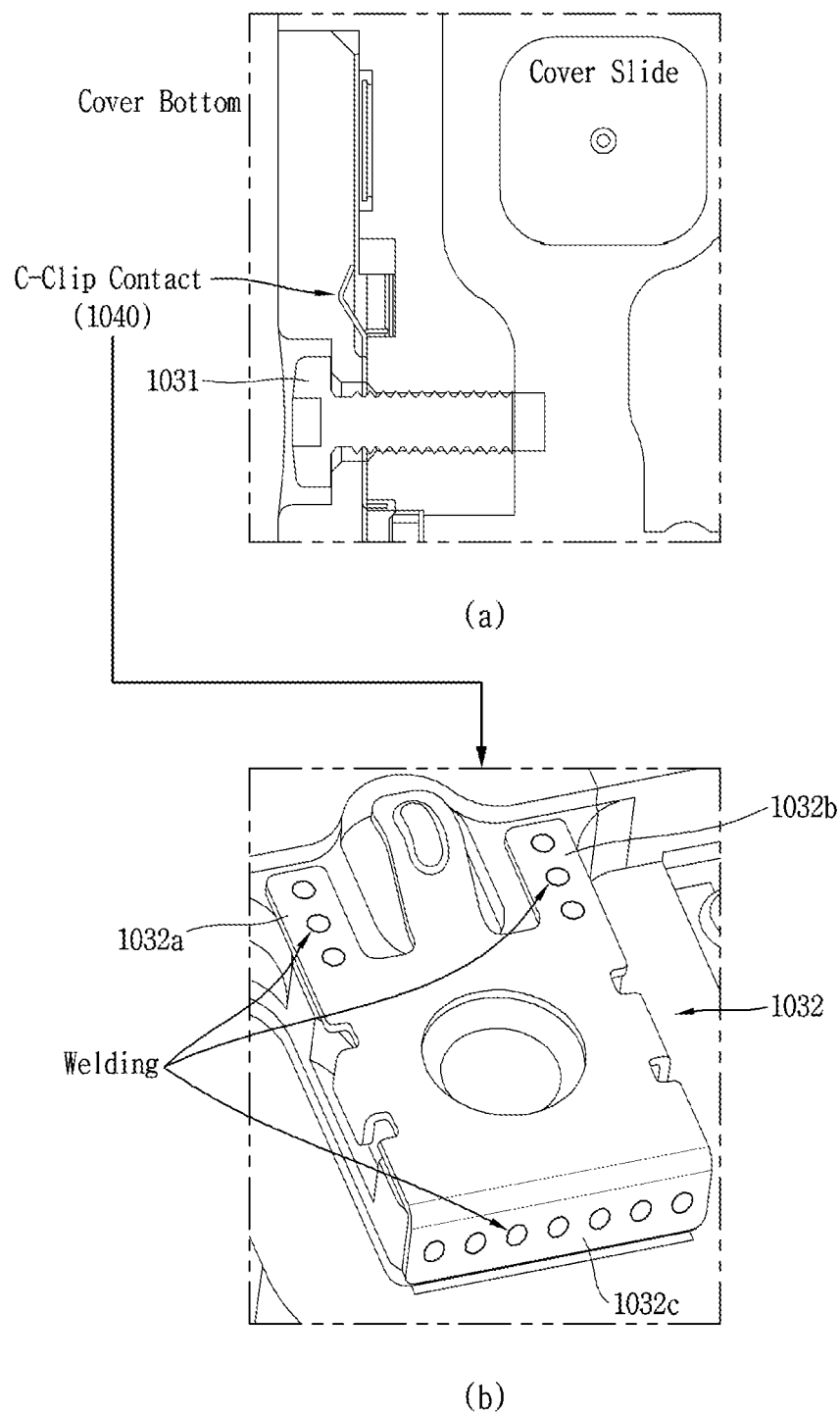
FIG. 10B illustrates a sectional view of a coupling structure between the separately manufactured metal housings, and an enlarged view of an accommodating portion implemented in a spring clipping manner.

Therefore, the display space can be maximized and antenna performance can be secured, by employing the coupling structure of the plurality of metal housings of the rollable display disclosed in the present disclosure. To this end, a partial region of the first metal housing 1010 and a partial region of the second metal housing 1020 may overlap each other. Meanwhile, the first and second metal housings independent of each other in the rollable device disclosed in the present disclosure may be fastened to each other. In this regard, FIG. 10A illustrates a structure in which the metal housings separated from each other are coupled to each other in accordance with one embodiment. FIG. 10B illustrates a sectional view of a coupling structure between the separately manufactured metal housings, and an enlarged view of an accommodating portion implemented in a spring clipping manner.

Referring to FIGS. 7A to 10B, the part of the first metal housing 1010 and the second metal housing 1020 may be coupled to each other through contact portions 1030. Each of the contact portions 1030 which may also be referred to as a fastening portion may include a screw 1031 and a reception portion 1021. The reception portion 1032 may be implemented as a spring clip contact. The screws 1031 may be inserted into the reception portions 1032, which are formed in the overlapped regions of the first and second metal housings 1010 and 1020, such that the first metal housing 1010 and the second metal housing 1020 can be electrically fastened to each other. That is, the first and second metal housings 1010 and 1020 coupled by the contact portions 1030 may be coupled in the spring clip contact manner that the screws 1031 and the reception portions 1032 implemented as the spring clip contacts are fastened to each other.

Referring to (a) of FIG. 10B, the first metal housing 1010 and the second metal housing 1020 may be further brought into contact with each other by a C-clip 1040 at a higher position than the contact portion 1030. Referring to (b) of FIG. 10B, for a stable contact between the first metal housing 1010 and the second metal housing 1020, the reception portion 1032 may be attached to the first metal housing 1010. Flat surface extension portions 1032a and 1032b and a side surface extension portion 1032c of the reception portion 1032 may be welded at a plurality of connection points, to be attached to the first metal housing 1010.

Referring to FIGS. 7 to 10B, in the first metal housing 1010 corresponding to the main frame in the rollable device that changes in size, a side frame 1011a and 1011b formed on the side surfaces of the mobile terminal and an inner frame 1011c formed inside the mobile terminal may be integrally formed with each other. The side frame may include a first portion 1011a that is a portion overlapping the second metal housing 1020 and a second portion 1011b that is a portion exposed to outside. The inner frame may be referred to as a third portion 1011c.

In this regard, the first metal housing 1010 may include the first portion 1011a overlapping the second metal housing 1020, the second portion 1011b separated by a slit and exposed to the outside, and the third portion 1011c formed inside the mobile terminal. On the other hand, a slot region SR from which a metal is removed may be formed between the third conductive member 1023 and the third portion 1011c. The first region 151a of the display may be disposed on the front surface of the mobile terminal corresponding to the slot region SR.

Figure 11A:
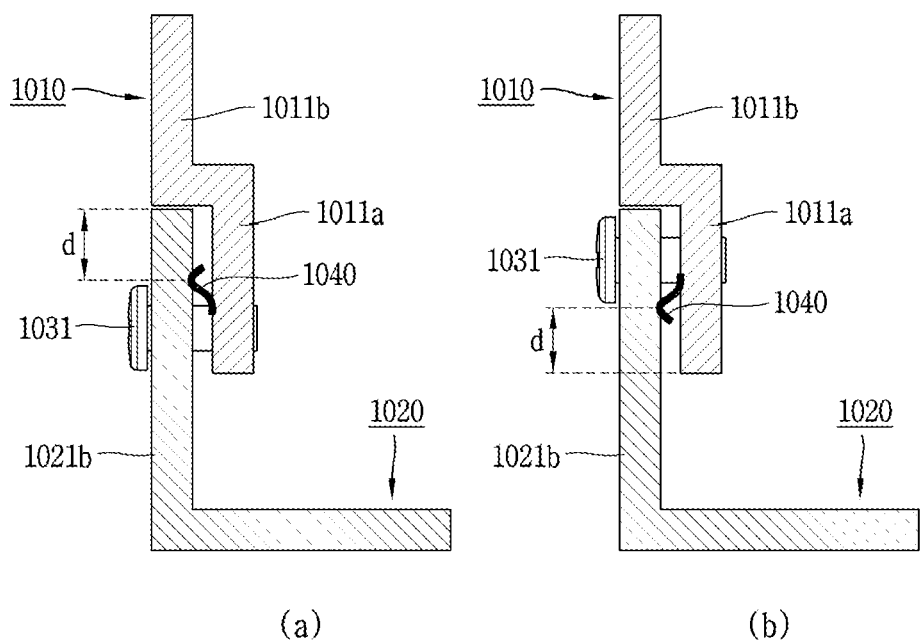
FIG. 11A illustrates a fastening structure of separately manufactured metal housings in accordance with embodiments.

Meanwhile, an overlap length between separately formed metal rims in the rollable device disclosed in the present disclosure may be limited to a predetermined length or shorter in order to maintain antenna performance. In this regard, FIG. 11A illustrates a fastening structure of separately provided metal housings in accordance with embodiments. (a) of FIG. 11A shows a structure in which the screw 1031 is fastened by being spaced apart a predetermined length d from an upper end of one side of the second metal housing 1020. (b) of FIG. 11A shows a structure in which the screw 1031 is fastened by being spaced apart the predetermined length d from a lower end of one side of the first metal housing 1010.

Figure 11B:
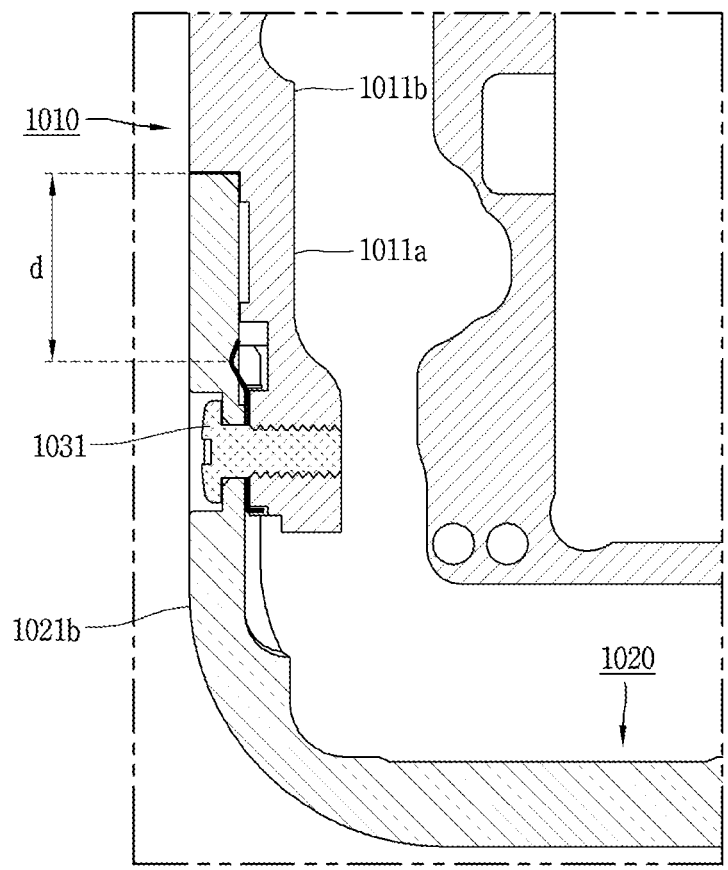
FIG. 11B illustrates a length of an overlap portion between the separately manufactured metal housings in accordance with one example.

FIG. 11B illustrates a length of an overlap portion between the separately provided metal housings according to one example. Referring to FIG. 11B, the length of the overlap portion between the metal housings may be shorter than 13.3 mm that is ¼ of the wavelength of an operating frequency of an antenna, for example, 3.5 GHz.

Accordingly, a length d of a section where the two metals overlap each other without an electrical connection may be set to be sufficiently shorter than 1 g/4, which is ¼ of a wavelength corresponding to the highest operating frequency (fh) of the antenna. Accordingly, a length d of a section where the first metal housing 1010 and the second metal housing 1020 overlap each other with a gap therebetween without being electrically connected may be set to be sufficiently shorter than 1 g/4, which is ¼ of the wavelength corresponding to the highest operating frequency (fh) of the antenna.

For example, the length of the overlap section between the first and second metal housings 1010 and 1020 may be set to 5.1 mm which is much shorter than 13.3 mm. Therefore, the length of the overlap section may be limited to about 0.1 wavelength, thereby maintaining the antenna characteristics of the first and second metal housings 1010 and 1020 which are electrically connected to each other with being spaced apart by the predetermined distance. In this way, the display region can be maximized and the antenna characteristics can be maintained through the separately provided metal housings in the rollable device. Therefore, the present disclosure is to minimize that capacitance by a capacitor structure due to the overlap region between the first and second metal housings 1010 and 1020 affects antenna performance. To this end, the length of the overlap portion of the first and second metal housings 1010 and 1020, namely, a region where the metal housings face each other may be limited to be less than a predetermined value, for example, less than d. Meanwhile, considering even a length of the first portion 1011a supporting the screw, the length of the region where the metal housings face each other may be set to be less than a predetermined value, for example, less than X>d.

In this regard, the first and second metal housings 1010 and 1020 may be electrically connected to each other by using a C-clip 1040 together with the screw 1031. The first and second metal housings 1010 and 1020 may be spaced apart from each other by a predetermined distance at the overlap portion while being electrically connected. Therefore, the section where the first and second metal housings 1010 and 1020 overlap each other without being electrically connected may not affect the change in antenna performance when it is smaller than ¼ of the wavelength corresponding to the maximum operating frequency of the antenna.

Referring to FIGS. 7A to 11B, the length from the contact portion 1030 to the overlap portion between the first portion 1011a and the second sub member 1021b may be shorter than or equal to ¼ of the wavelength of the operating frequency of the antenna, which is formed on at least a portion of the second metal housing 1020.

Figure 12A:
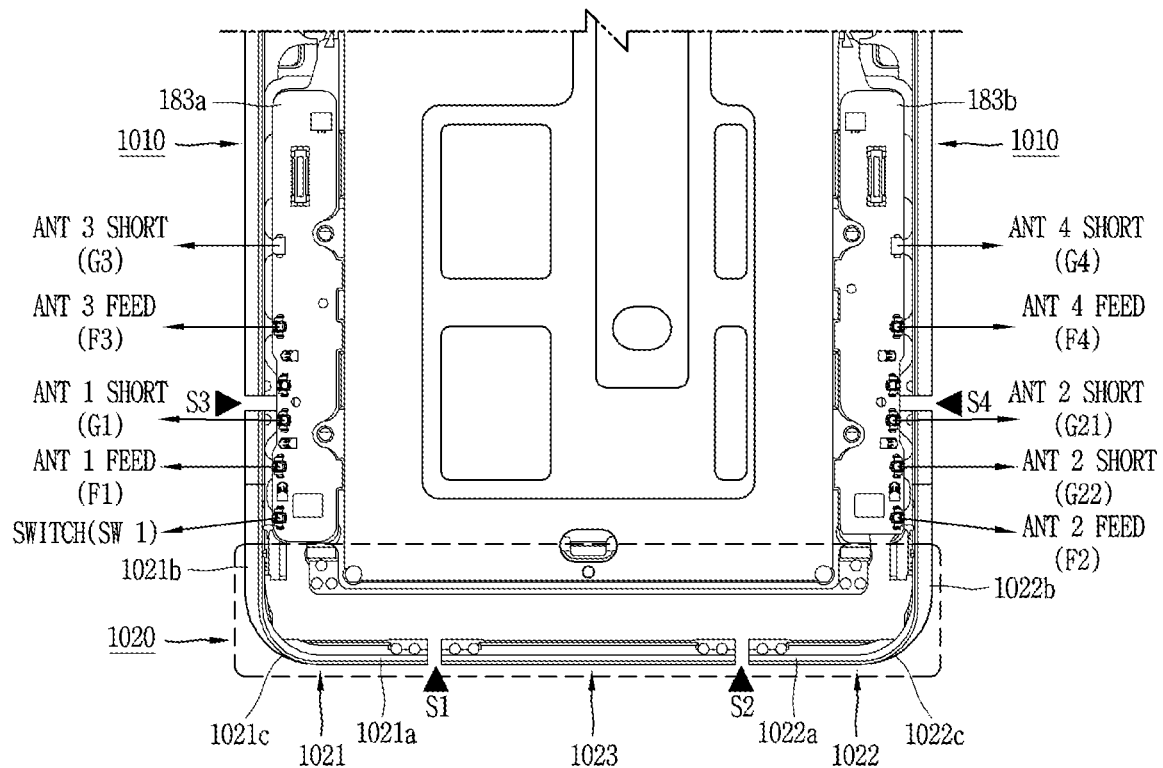
FIG. 12A illustrates a configuration in which side PCB s and side metal frames are electrically connected to each other in accordance with an embodiment.
Figure 12B:
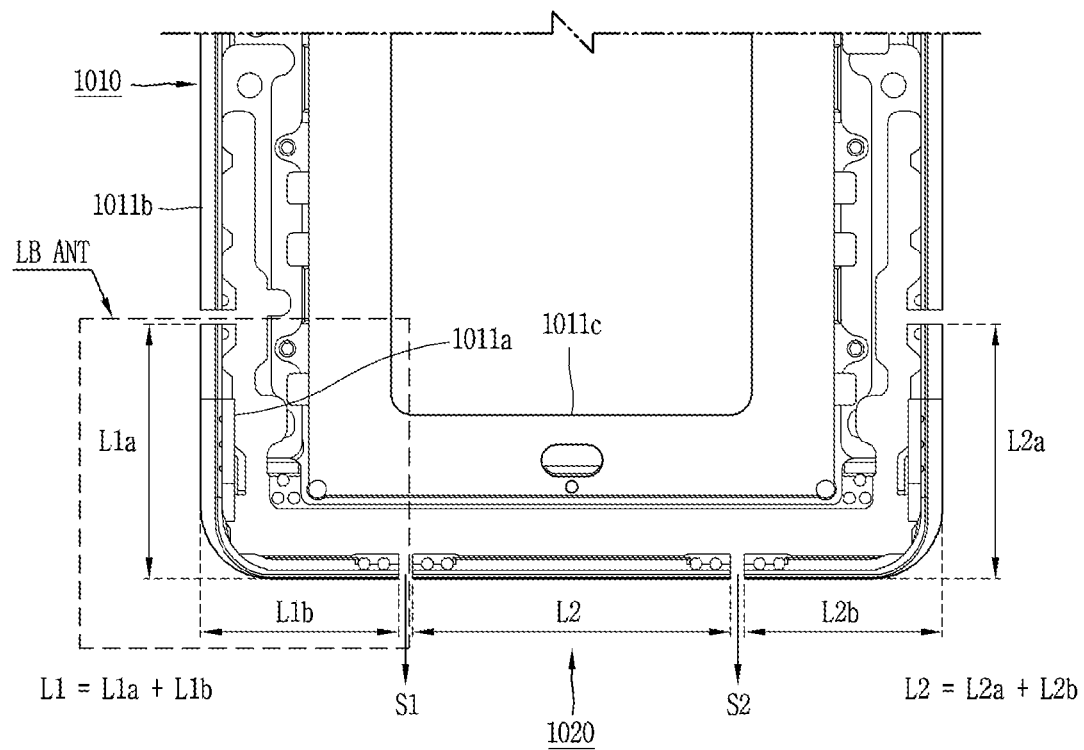
FIG. 12B illustrates a configuration in which the side PCBs are not disposed in the mobile terminal of FIG. 12A.

Meanwhile, the side PCBs may be electrically connected to specific points of the metal housings disposed on the side surfaces of the mobile terminal, to feed the antennas. In this regard, FIG. 12A illustrates a configuration in which the side PCBs and the side metal frames are electrically connected in accordance with an embodiment. FIG. 12B illustrates a configuration in which the side PCBs are not disposed in the mobile terminal of FIG. 12A.

Referring to FIGS. 7A to 12B, a feed portion F1 and a ground portion G1 may be connected to the first portion of the first metal housing 1010 from the second PCB 183a. The contact portion having tension may be disposed between the first portion and the second sub member 1021b. The second PCB 183a may further include a switch SW1 that is configured to adjust an operating frequency of the first antenna ANT1.

The feed portion F1 may be electrically connected to the first metal housing 1010 at a first point. The ground portion G1 may be electrically connected at a second point adjacent to an end portion of the first metal housing 1010. The switch SW1 may be electrically connected to the second sub member 1021b of the second metal housing 1020.

Meanwhile, the feed portion and the ground portion may be formed on both sides of the first metal housing 1010 by the second PCB 183a and the third PCB 183b. The feed portion F1 and the ground portion G1 of the first antenna ANT1 may be connected to one side of the first portion of the first metal housing 1010 from the second PCB 183a. Also, a feed portion F2, a first ground portion G21, and a second ground portion G22 of the second antenna ANT2 may be connected to another side of the first portion of the first metal housing 1010 from the third PCB 183a. Accordingly, the first antenna ANT1 may be implemented by using partial regions of the first metal housing 1010 and the second metal housing 1020. The first antenna ANT1 may be disposed in a region between slits S1 and S3. Also, the second antenna ANT2 may be implemented by using the partial regions of the first metal housing 1010 and the second metal housing 1020. The second antenna ANT2 may be disposed in a region between slits S2 and S4.

A feed portion F3 and a ground portion G3 of the third antenna ANT3 may be connected to one side of the first portion of the first metal housing 1010 from the second PCB 183a. Also, a feed portion F4 and a ground portion G4 of the fourth antenna ANT4 may be connected to another side of the first portion of the first metal housing 1010 from the third PCB 183a. The third antenna ANT3 may be spaced apart from the first antenna ANT1 by the slit S3. The fourth antenna ANT4 may be spaced apart from the second antenna ANT2 by the slit S4.

Referring to FIG. 12B, through the antennas having the coupling structure of the separately provided metal housings disclosed in the present disclosure, a display disposition space can be secured in the lower region of the mobile terminal while extending lengths of the antennas disposed on the side surfaces of the mobile terminal. This can improve antenna characteristics in a specific operating band. In this regard, technical characteristics of the antennas formed on the bottom and one side surface of the mobile terminal may be summarized as follows.

1) The third conductive member 1023 formed with being spaced apart from the end portions of the first and second conductive members 1021 and 1022 by the slits between the first and second conductive members 1021 and 1022 corresponding to the lower conductive members is not used as a radiator. Therefore, the third conductive member 1023 plays auxiliary roles, such as isolation improvement with the first and second conductive members 1021 and 1022 on the both sides thereof, antenna tuning, and the like.

2) To avoid resonance overlapping with the first antenna (ANT1) 1110 as the LB antenna, a length L2 between the slits S1 and S2 of the lower metal is set to be smaller than a length (L1=L1a+L1b) of the LB antenna.

3) The slits S1 and S2 are disposed at optimal positions by considering radiation performance, hand effects, and the like of the first and second antennas ANT1 and ANT2 disposed on both sides. For example, considering that the gripped state by the user is symmetrical on average, a length L1b from one end portion to the slit S1 may be the same as a length L2b from another end portion of the slit S2.

On the other hand, a region between the lower end portion of the first metal housing 1010 and the second metal housing 1020 is an empty space in which the display 151a of FIG. 9A is rollable, and may be defined as a slot region SR. The slot region SR may also be referred to as a display rolling region.

The plurality of antennas disposed on the bottom and the side surfaces of the mobile terminal disclosed herein may vary antenna operating bands through an antenna tuner and/or a switch. In this regard, FIG. 13 illustrates feeding and grounding positions of adjacent antennas which are disposed on the bottom and the side surfaces of the mobile terminal in accordance with one embodiment.

Figure 13:
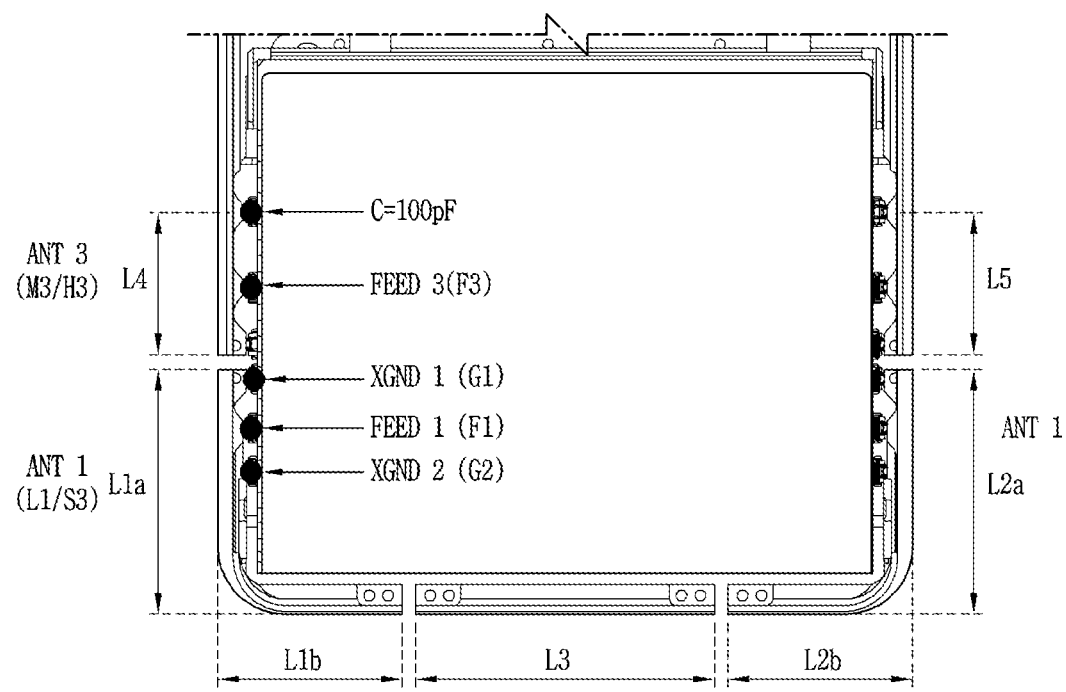
FIG. 13 illustrates feeding and grounding positions of adjacent antennas which are disposed on a bottom and side surfaces of a mobile terminal in accordance with one embodiment.

Referring to FIG. 13, the first antenna ANT1 may be connected to the feed portion F1. The first antenna ANT1 may be electrically connected to the first and second ground portions G1 and G2 at an upper position and a lower position from a connected point of the feed portion F1. In this case, the second ground portion G2 may also be connected to the ground through the switch SW1 as illustrated in FIG. 12A. The first antenna ANT1 may operate to double-resonate in LB and UHB. In this case, LB switching may be performed through an antenna tuner such as an LC resonant circuit. Accordingly, the first antenna ANT1 may operate in bands of B71 to B5.

The third antenna ANT3 may be connected to the feed portion F3. The third antenna ANT3 may be connected to the ground through a capacitor C3 at an upper portion from a connected point of the feed portion F3. For example, the point where the third antenna ANT3 is connected to the ground through the capacitor C3 may be a point spaced apart a predetermined length L4 from a spaced end portion of the third antenna ANT3 by the slit. As the third antenna ANT3 is connected to the ground through the capacitor C3, deviation does not occur in the antenna characteristics of the third antenna ANT3, such as radiation efficiency, etc. even when the first antenna ANT1 is switched for each band.

Meanwhile, the lengths of the plurality of antennas ANT1 to ANT4 disposed the bottom portion and one and another side surfaces of the mobile terminal and the disposition structure of the slits S1 and S2 may be implemented in a left-right symmetrical structure as illustrated in FIG. 13. Accordingly, the lengths L1a and L2a of the first antenna ANT1 and the second antenna ANT2 on the side surfaces may be set to be the same. Also, the lengths L1b and L2b of the first antenna ANT1 and the second antenna ANT2 on the bottom portion may be set to be the same.

However, the lengths of the antennas and the slit disposition structure are not limited to the left-right symmetrical structure as illustrated in FIG. 13. For example, referring to FIG. 12B, since the first antenna ANT1 operates even in LB, the length L1 of the first antenna ANT1 may be longer than the length L2 of the second antenna ANT2. In this regard, the length L1 of the first antenna ANT1 may be determined as the sum (L1a+L1b) of effective lengths of the first and second sub members. Also, the length L2 of the second antenna ANT2 may be determined as the sum (L2a+L2b) of effective lengths of the first and second sub members. In view of the first antenna ANT1, the sum of the effective lengths of the first and second sub members may be determined as the sum of the lengths of the first and second sub members and a length of the corner region. Similarly, in view of the second antenna ANT2, the sum of the effective lengths of the first and second sub members may be determined as the sum of the lengths of the first and second sub members and a length of the corner region.

Referring to FIGS. 7A to 13, the first metal housing 1010 of the mobile terminal may further include a fourth conductive member 1014 and a fifth conductive member 1015. The fourth conductive member 1014 may be disposed on a left side surface of the second portion of the first metal housing 1010. The fifth conductive member 1015 may be disposed on a right side surface of the second portion of the first metal housing 1010. The first conductive member 1014 and the fifth conductive member 1015 may operate as the third antenna ANT3 and the fourth antenna ANT4, respectively.

The wireless communication unit of the first PCB 181 may control the operations of the first antenna ANT1 to the fourth antenna ANT4. Accordingly, the MIMO (or diversity) operation may be performed by using two or more of the first to fourth antennas ANT1 to ANT4. The CA operation may be performed by using at least one of the first antenna ANT1 to the fourth antenna ANT4. The MIMO+CA operation may be performed by using two or more of the first antenna ANT1 to the fourth antenna ANT4.

In this regard, as aforementioned, the first antenna ANT1 may be electrically connected to the feed portion F1 and the ground portion G1 from the second PCB 183a to one side of the first portion of the first metal housing 1010. The second antenna ANT2 may be electrically connected to the second feed portion F2, the first ground portion G1, and the second ground portion G2 from the third PCB 183b to another side of the first portion of the first metal housing 1010.

The third antenna ANT3 may be electrically connected to the third feed portion F3 and the third ground portion G3 from the second PCB 183a to one side of the second portion of the first metal housing 1010. The fourth antenna ANT4 may be electrically connected to the fourth feed portion F4 and the fourth ground portion G4 from the third PCB 183b to another side of the second portion of the first metal housing 1010.

Referring to FIGS. 12A and 12B, the ground portion G2 of the second antenna ANT2 may be electrically connected to the second portion at a position adjacent to an end portion of the first portion. The ground portion G4 of the fourth antenna ANT4 may be electrically connected to the second portion at a position adjacent to the slit S4 of the second portion. Therefore, the ground portion G2 of the second antenna ANT2 and the ground portion G4 of the fourth antenna ANT4 can be located adjacent to the both end portions of the slit S4, so as to improve isolation between the second antenna ANT2 and the fourth antenna ANT4.

Figure 14A:
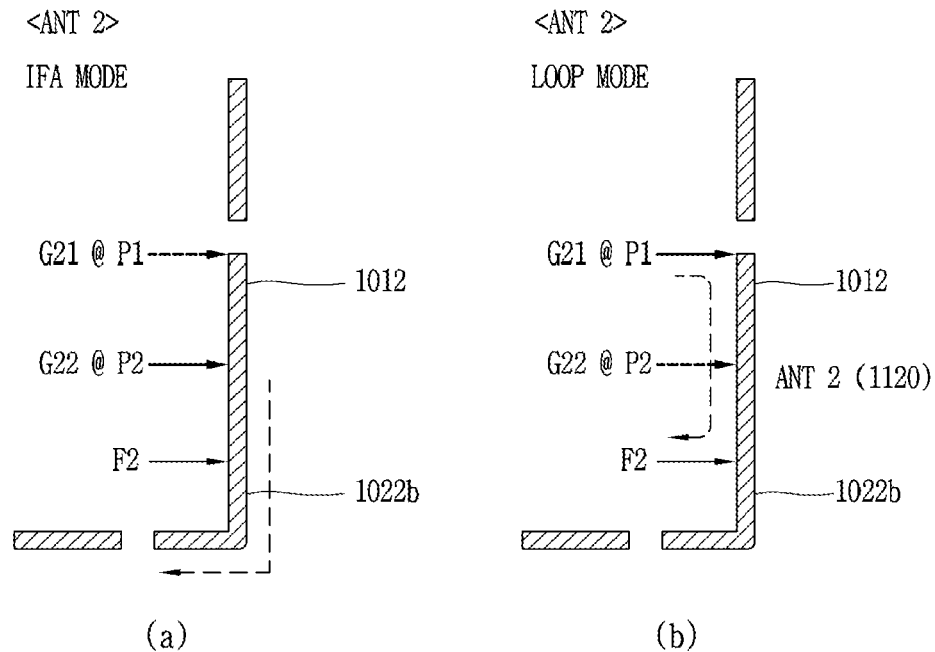
FIG. 14A is a conceptual view illustrating that antennas operate in different modes in MB/HB in accordance with an embodiment.
Figure 14B:
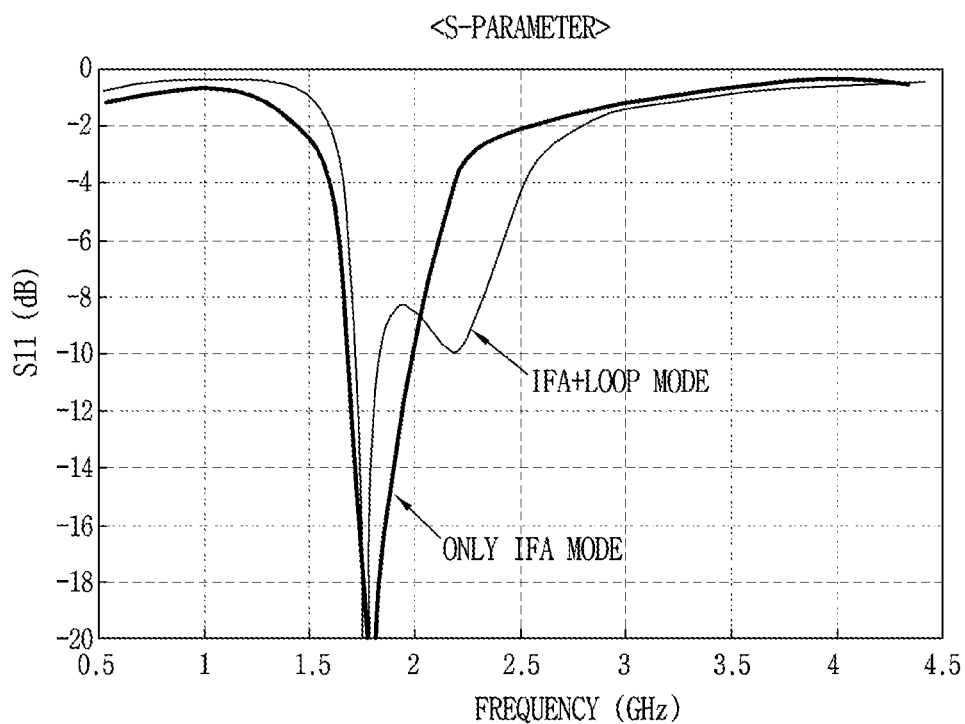
FIG. 14B illustrates S-parameter characteristics of an antenna operating only in an IFA mode and an antenna operating in a dual mode.

Meanwhile, the second antenna ANT2 that is an MB/HB antenna disclosed herein may operate in a dual mode. In this regard, FIG. 14A is a conceptual view illustrating that antennas operate in different modes in MB/HB according to an embodiment. FIG. 14B illustrates S-parameter characteristics of an antenna operating only in an IFA mode and an antenna operating in a dual mode.

Referring to FIGS. 14A and 14B, specifically, the second antenna ANT2 operates as an inverted-F antenna (IFA) in MB by the feed portion F2 and the ground portion G22. The second antenna ANT2 forms a loop mode by the second feed portion F2 and the first ground portion G21 disposed adjacent to an end portion of the lateral side frame 1012. Meanwhile, the second feed portion F2 and the second ground portion G22 disposed between the first ground portion G21 and the second feed portion F2 forms an IFA mode. In this regard, the second feed portion F2 is electrically connected to the second sub member 1022b. The first ground portion G21 is electrically connected to a first point P1 adjacent to an end portion of the first metal housing 1012, and the second ground portion G21 is electrically connected to a second point P2 of the first metal housing 1012.

On the other hand, the second antenna ANT2 operates as a loop antenna in HB by a loop formed by the feed portion F2 and the first ground portion G21. Referring to FIG. 14B, as compared to the antenna operating only in the IFA mode, an antenna structure operating in the IFA mode in MB and operating in the loop mode in HB enables a broadband operation of the antenna. Therefore, an issue that an antenna bandwidth is narrowed due to the limitation of disposition space for a feed portion on the lower side can be solved by combination of IFA+loop mode.

Figure 15A:
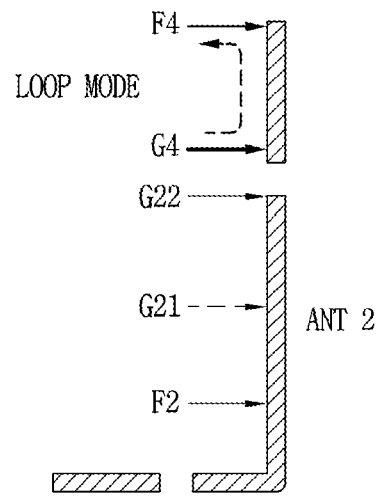
FIG. 15A is a conceptual view illustrating that different antennas operate in a loop mode in HB/UHB, and shows isolation between the antennas.
Figure 15A:
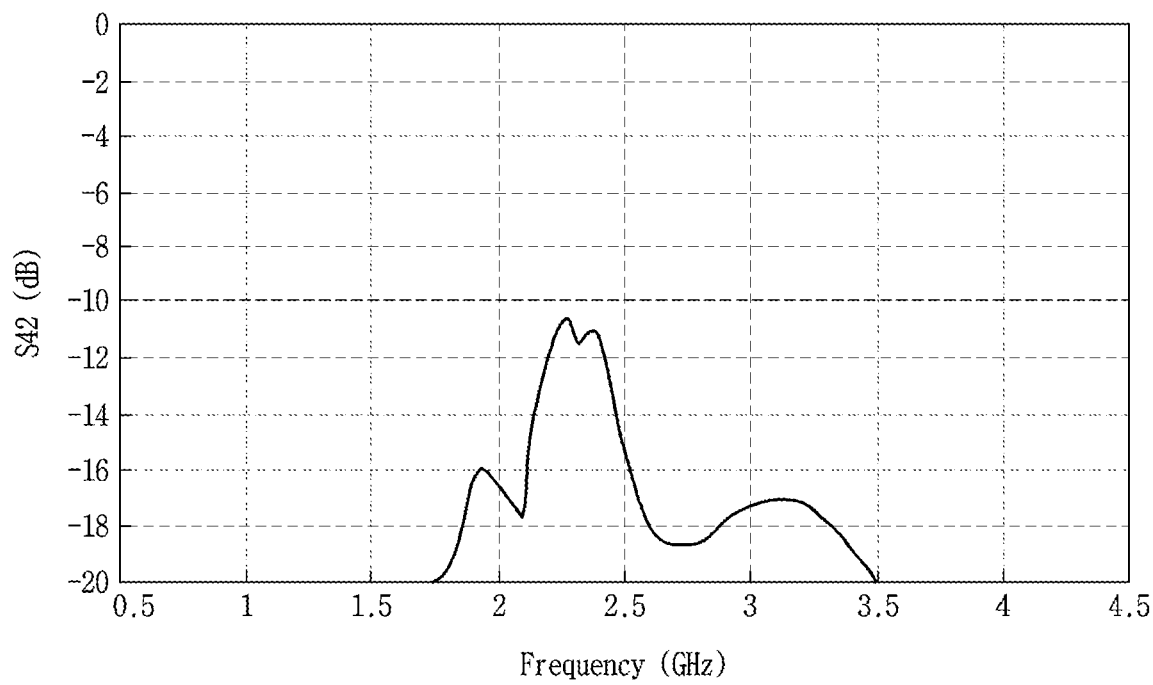

FIG. 15A is a conceptual view illustrating that different antennas operate in a loop mode in HB/UHB. Referring to FIG. 14 to (a) of FIG. 15A, the second antenna ANT2 may operate in the IFA mode to transmit and receive signals through lower side radiation. Also, the second antenna ANT2 may operate in the loop mode to transmit and receive signals through lateral side radiation.

The fourth antenna ANT4 may operate in the loop mode in HB/UHB by the loop formed by the fourth feed portion F4 and the ground portion G4. In this case, the second antenna ANT2 disposed adjacent to the fourth antenna ANT4 may be configured such that the first ground portion G21 is electrically connected and the second ground portion G22 is electrically open. The fourth antenna ANT4 may operate in the loop mode to transmit and receive signals through lateral side radiation. Therefore, as for the lateral side radiation mode of transmitting and receiving signals through the lateral side radiation, the antenna is designed as a loop type, which can improve isolation characteristics between antennas and antenna performance change according to hand effects when the mobile terminal is gripped.

The second antenna ANT2 and the fourth antenna ANT4 are separated by the slit and adjacent end portions thereof are grounded by the ground portions G21 and G2, thereby improving the isolation characteristics between the second antenna ANT2 and ANT4. Referring to (b) of FIG. 15A, isolation S42 between the second antenna ANT2 and the fourth antenna ANT4 has a value of −10 dB or less in an operating band. Therefore, referring to the isolation S42 between the second antenna ANT2 and the fourth antenna ANT4 in the operating band, the second antenna ANT2 and the fourth antenna ANT4 can operate independently without interference therebetween. Also, referring to the isolation S42 between the second antenna ANT2 and the fourth antenna ANT4 in the operating band, the second antenna ANT2 and the fourth antenna ANT4 may be used simultaneously to operate in a MIMO mode or CA mode.

Figure 15B:
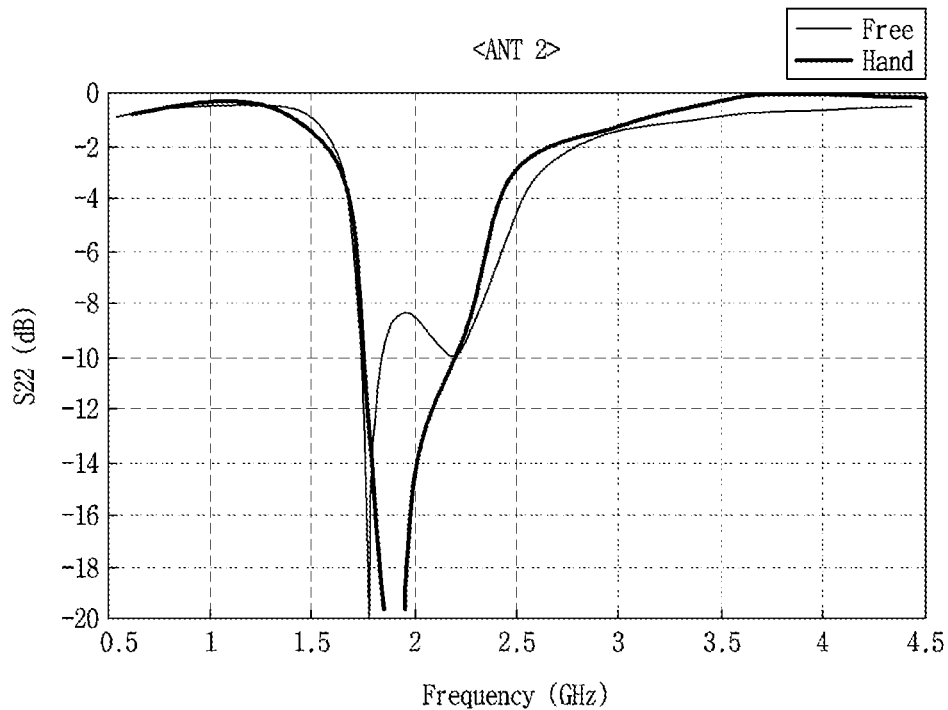
FIG. 15B illustrates reflection coefficient characteristics of different antennas, which are adjacent to each other with a slit interposed therebetween on a side surface of a mobile terminal, depending on whether or not the mobile terminal is in a gripped state.
Figure 15B:
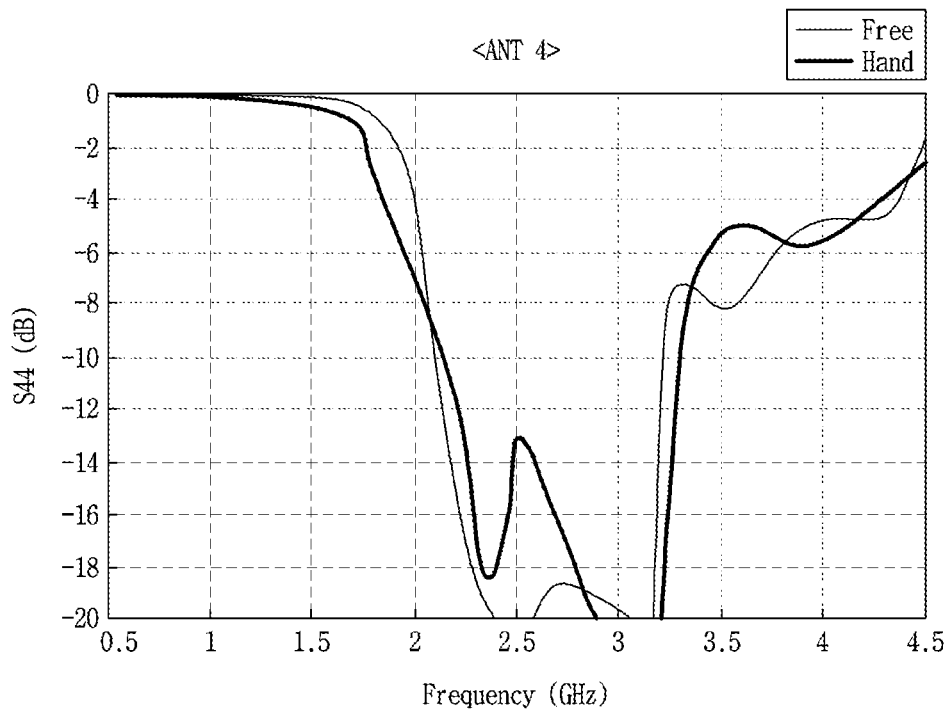

FIG. 15B illustrates reflection coefficient characteristics of different antennas, which are adjacent to each other with being spaced apart from each other by a slit on a side surface of a mobile terminal, depending on whether or not the mobile terminal is gripped. Referring to FIG. 15A and (a) of FIG. 15B, in a free state in which the user does not grip the mobile terminal and a hand state in which the user grips the mobile terminal, the second antenna ANT2 operates as a radiator in the operating band (MB/HB). In the free state without gripping the mobile terminal, the second antenna ANT2 has a broadband characteristic of dual resonance by the combination of IFA+loop mode. On the other hand, in the hand state in which the mobile terminal is gripped, the second antenna ANT2 has a single resonance characteristic but also has a broadband characteristic.

Referring to FIG. 14B and (a) of FIG. 15B, the second antenna ANT2 having the different ground portions G21 and G22 has a more broadband characteristic, even in the hand state, than that in the case of operating only in the IFA mode. Therefore, the second antenna ANT2 disposed on the side surface and the lower side of the mobile terminal can be advantageously configured, by use of the different ground portions G21 and G22, not to be sensitive to the hand effect due to gripping.

Referring to FIG. 15A and (b) of FIG. 15B, in the free state in which the user does not grip the mobile terminal and the hand state in which the user grips the mobile terminal, the fourth antenna ANT4 operates as a radiator in the operating band (HB/UHB). Also, there is not a great change in reflection coefficient characteristic of the fourth antenna depending on whether the mobile terminal is gripped. Therefore, the fourth antenna ANT4 disposed on the side surface of the mobile terminal can also be advantageously configured, by use of the ground portion G4 disposed on the end portion, not to be sensitive to the hand effect due to gripping.

Figure 16:
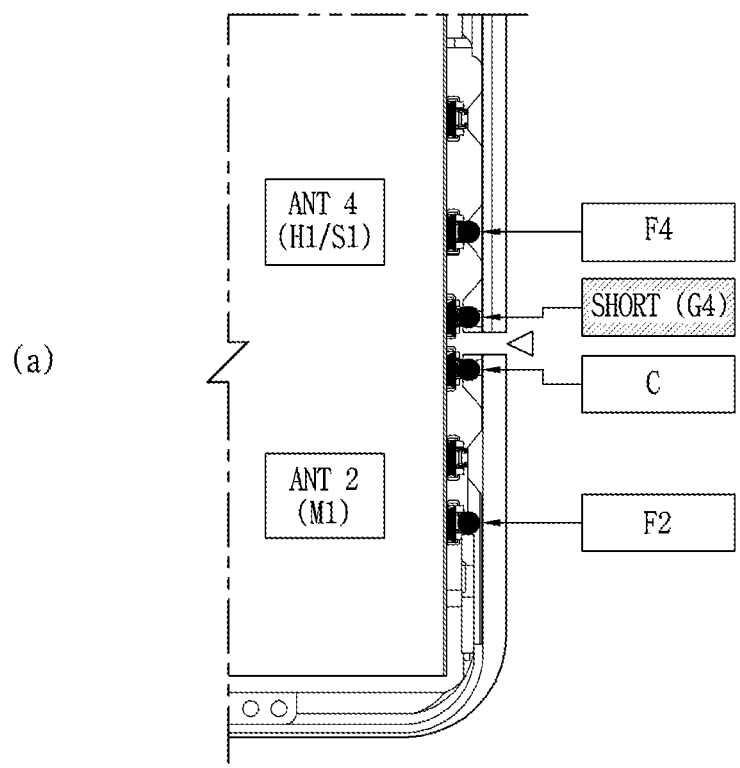
FIGS. 16 to 18 illustrate antenna tuner configurations and antenna characteristics for a first single mode, a second single mode, and a dual mode.
Figure 17:
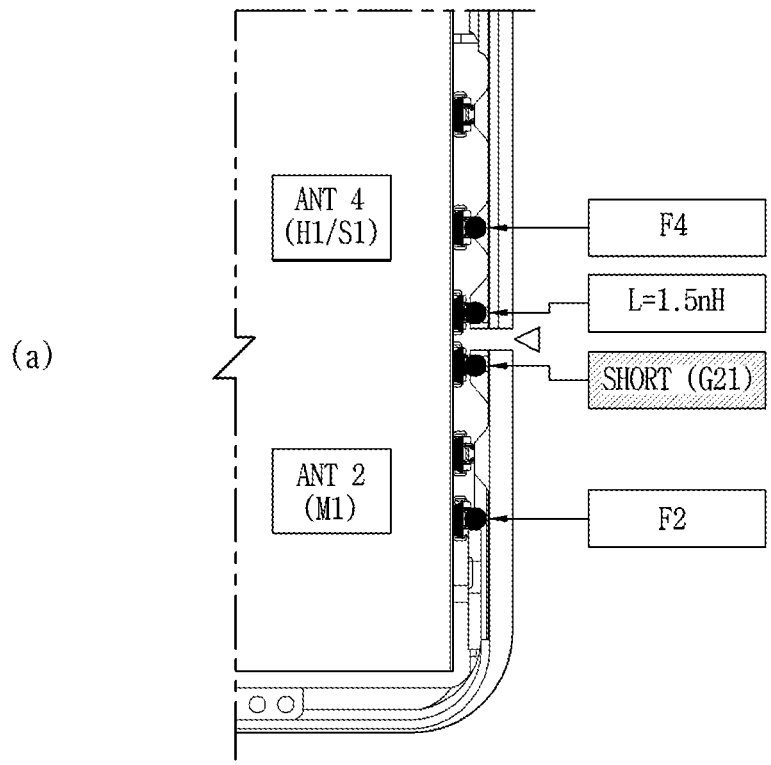
Figure 18:
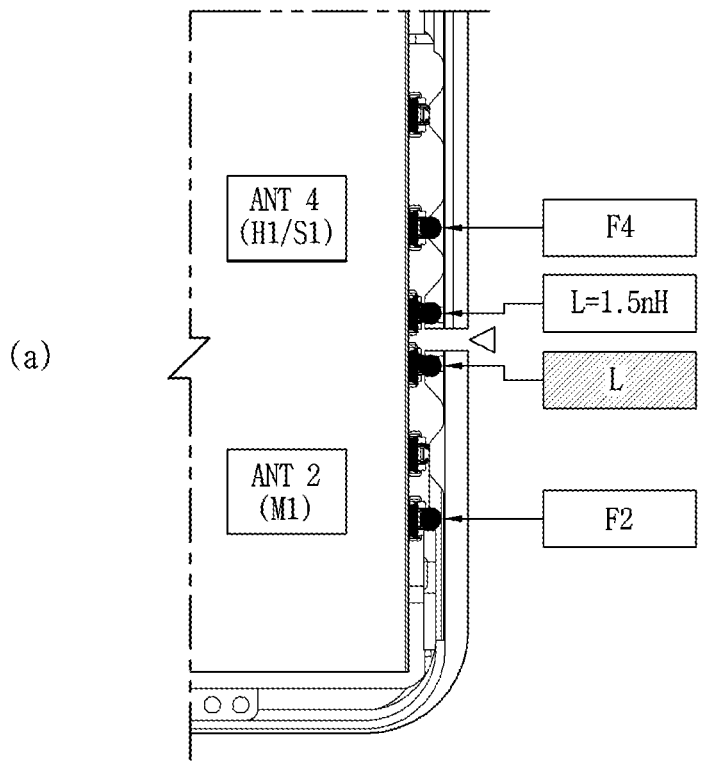

According to an embodiment of the present disclosure, any one of the second and fourth antennas ANT2 and ANT4 that are disposed adjacent to each other with the slit interposed therebetween may operate or both the antennas may operate. In this regard, FIGS. 16 to 18 illustrate antenna tuner configurations and antenna characteristics for a first single mode, a second single mode, and a dual mode. An antenna tuning configuration between the second and fourth antennas may be applied similarly to an antenna tuning configuration between the first and third antennas.

Referring to FIG. 12A and (a) of FIG. 16, in a first single mode in which only the second antenna ANT2 operates, the ground portion G21 of the second antenna ANT2 may be electrically connected to the third PCB through a capacitor C. The ground portion G4 of the fourth antenna ANT4 may be shorted from the third PCB 183b. When only the second antenna operates, the wireless communication unit may control switches such that the ground portion G21 of the second antenna is electrically connected to the third PCB through the capacitor and the ground portion G4 of the fourth antenna is shorted from the third PCB. As the end portion of the fourth antenna ANT4 is grounded, an interference level with the second antenna ANT2 may be lowered.

Referring to FIG. 12A and (a) of FIG. 17, in a second single mode in which only the fourth antenna ANT4 operates, the ground portion G21 of the second antenna ANT2 may be shorted from the third PCB 183b. The ground portion G4 of the fourth antenna ANT4 may be electrically connected to the third PCB 183b through an inductor L. For example, an inductance value of the inductor L may be 1.5 nH, but is not limited thereto. When only the fourth antenna operates, the wireless communication unit may control switches such that the ground portion G21 of the second antenna is shorted from the third PCB and the ground portion G4 of the fourth antenna is electrically connected to the third PCB through the inductor. As the end portion of the second antenna ANT2 is grounded, an interference level with the fourth antenna ANT4 may be lowered.

Referring to FIGS. 12A and (a) of FIG. 18, the second and fourth antennas ANT2 and ANT4 may operate in a dual mode. In the dual mode, the second and fourth antennas ANT2 and ANT4 may operate in the CA mode or operate in the MIMO mode in the same frequency band of HB. The ground portion G21 of the second antenna ANT2 may be electrically connected to the third PCB 183b through the first inductor L1 in the dual mode. The ground portion G4 of the fourth antenna ANT4 may be electrically connected to the third PCB 183b through a second inductor L2. For example, an inductance value of the second inductor L2 may be 1.5 nH, but is not limited thereto. In the dual mode, the wireless communication unit may control the switches such that the ground portion G21 of the second antenna and the ground portion G4 of the fourth antenna ANT4 are electrically connected to the third PCB 183b through the first inductor and the second inductor. In the dual mode, it is effective to constitute an antenna tuner such that antenna efficiency is improved by a mutual boosting effect rather than isolation between adjacent antennas.

Referring to values according to frequencies of (b) of FIG. 16 and (b) of FIG. 18, radiation efficiency of the second antenna has a higher value in the first single mode than that in the dual mode. Meanwhile, when the hand effect occurs by the user's gripping, the radiation efficiency of the antenna has a higher value in the dual mode than that in the first single mode. Therefore, while only the second antenna is operating, when it is determined that the hand effect occurs, the processor controls the second antenna and the fourth antenna to operate together. In this regard, the processor may be operably coupled to the wireless communication unit. The wireless communication unit may be an RFIC and/or modem and the processor may be an application processor, but may not be limited thereto. The processor may control the switches such that the ground portions G21 and G4 of the second and fourth antennas are electrically connected to the third PCB through the first and second inductors L1 and L2.

Referring to values according to frequencies of (b) of FIG. 17 and (b) of FIG. 18, radiation efficiency of the fourth antenna has a higher value in the second single mode than that in the dual mode. Meanwhile, when the hand effect occurs by the user's gripping, the radiation efficiency of the antenna has a higher value in the dual mode than that in the second single mode. Therefore, while only the fourth antenna is operating, when it is determined that the hand effect occurs, the processor controls the second antenna and the fourth antenna to operate together. To this end, the processor may control the switches such that the ground portions G21 and G4 of the second and fourth antennas are electrically connected to the third PCB through the first and second inductors L1 and L2.

Meanwhile, the wireless communication unit may control the second and fourth antennas ANT2 and ANT4 to perform CA and fall back to the single mode. In this regard, upon the fallback to the single mode, the wireless communication unit may preferentially select the fourth antenna ANT4. In this regard, antenna efficiency of the second antenna ANT2 is decreased more than that of the fourth antenna ANT4 when the user grips the mobile terminal. Also, in the second single mode, the fourth antenna ANT4 may maintain a tuning circuit configuration in the dual mode. Therefore, upon the fallback to the second single mode, only a tuning circuit configuration of the second antenna ANT2 is changed. Therefore, the wireless communication unit may control the switches to short the ground portion G21 of the second antenna ANT2 from the third PCB 183b, such that only the fourth antenna ANT4 operates.

Meanwhile, an electronic device supporting 4G and 5G communication services according to the present disclosure may be provided in various form factors. As an example of the form factors for the electronic device, a rollable device may be considered. A metal rim frame of an electronic device having various form factors may have an integral structure or a variable structure. In this regard, a rollable device having an integral frame structure has a difficulty in implementing a rollable display.

The rollable display may be configured to have a display region which is decreased or increased by a variable mechanism structure. When metal frames of a rollable device having a variable mechanism structure is used as antennas, it is difficult to secure antenna performance owing to the metal frames separate provided from each other.

The present disclosure is directed to solving the aforementioned problems and other drawbacks. One aspect of the present disclosure is to provide a disposition of antennas in rim regions of an electronic device even when a form factor changes.

Another aspect of the present disclosure is to provide a disposition of antennas in rim regions in a rollable device which has a display rollable to one side.

Still another aspect of the present disclosure is to provide a disposition of antennas in rim regions in a vertical rollable device.

Still another aspect of the present disclosure is to secure antenna performance of a predetermined level or higher while overcoming an antenna design space limitation.

Still another aspect of the present disclosure is to provide an antenna feeding structure in which a change in antenna characteristics is insensitive to a change in size of a mobile terminal.

Meanwhile, an electronic device may maintain a dual connectivity state with eNB and gNB by using a plurality of antenna modules disclosed herein. Alternatively, multi-input and multi-output (MIMO) may be performed with a first communication system or a second communication system using the plurality of antenna modules. In this regard, one of the plurality of antennas performing MIMO with the first communication system or the second communication system may be referred to as a first antenna module and another referred to as a second antenna module. Referring to FIGS. 1A to 18C, a plurality of antennas selected from the first antenna ANT1 to the fourth antenna ANT4, disposed on the bottom of the mobile terminal that changes in size may be referred to as a first antenna module and a second antenna module, respectively. As another example, a plurality of antennas selected from the first antenna ANT1 to the sixth antenna ANTE, which can operate in LTE/5G Sub6 bands, may be referred to as a first antenna module and a second antenna module, respectively.

The electronic device may further include a transceiver circuit 1250 and a baseband processor 1400. The transceiver circuit 1250 may be operably coupled to the first antenna module and the second antenna module. The transceiver circuit 1200 may be configured to control the first antenna module and the second antenna module. In this regard, the transceiver circuit 1250 may switch on or off signals applied to the first antenna module and the second antenna module or control magnitudes of such signals.

The baseband processor 1400 corresponding to a modem may be operably coupled to the transceiver circuit 1250. The baseband processor 1400 may perform MIMO through the first antenna module and the second antenna module.

In this regard, the baseband processor 1400 may control the transceiver circuit 1250 to perform UL-MIMO by transmitting a first signal and a second signal. Also, the baseband processor 1400 may control the transceiver circuit 1250 to perform DL-MIMO by receiving the first signal and the second signal.

When the quality of a signal received through the first antenna module or the second antenna module is lower than or equal to a threshold value, the corresponding antenna module may be switched to another connectivity. For example, when the quality of a signal received through the first antenna module or the second antenna module is lower than or equal to a threshold value, the corresponding antenna module may be switched to another communication system, namely, switching between 4G and 5G communication systems may be performed.

In this regard, when the first signal received through the first antenna module is lower than or equal to the threshold value, the baseband processor 1400 may release a MIMO mode and switch to the dual connectivity state. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the first antenna module may be made. Therefore, the electronic device can be switched to an EN-DC state. Meanwhile, when 4G MIMO is performed through the first antenna module and the second antenna module, switching to the 5G communication system through the first antenna module may be made. Therefore, the electronic device can be switched to an EN-DC state.

As another example, the baseband processor 1400 may release the MIMO mode and switch to a dual connectivity state when the second signal received through the second antenna module is lower than or equal to the threshold value. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the second antenna module may be made. Therefore, the electronic device can be switched to an EN-DC state. Meanwhile, when 4G MIMO is performed through the first antenna module and the second antenna module, switching to the 5G communication system through the second antenna module may be made. Therefore, the electronic device can be switched to an EN-DC state.

As described above, the electronic device may operate in the EN-DC state of maintaining a connectivity state with both the 4G communication system and the 5G communication system. In this regard, a first antenna module and a second antenna module may be configured to operate in a first communication system and a second communication system, respectively. Here, the first and second communication systems may be a 4G communication system and a 5G communication system, but the present disclosure is not limited thereto.

On the other hand, when quality of a signal received through an antenna module in the EN-DC state is less than or equal to a threshold value, the baseband processor 1400 may control the transceiver circuit to receive a signal of another communication system through the antenna module. In this regard, the baseband processor 1400 may determine whether the quality of the first signal of the first communication system received through the first antenna module is lower than or equal to the threshold value. When the quality of the first signal is less than or equal to the threshold value, the baseband processor 1400 may control the transceiver circuit 1250 to receive the second signal of the second communication system through the first antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

As another example, the baseband processor 1400 may determine whether the quality of the second signal of the second communication system received through the second antenna module is lower than or equal to the threshold value. When the quality of the second signal is less than or equal to the threshold value, the baseband processor 1400 may control the transceiver circuit 1250 to receive the first signal of the first communication system through the second antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

Meanwhile, the electronic device may be allocated with time/frequency resources for MIMO or EN-DC from the base station. In this regard, the baseband processor 1400 may determine whether a resource including a specific time section and a frequency band is allocated as a DL-MIMO resource through blind decoding for a PDCCH region and a corresponding resource region. The baseband processor 1400 may control the transceiver circuit 1250 to receive the first signal through the first antenna module and the second signal through the second antenna module in the allocated specific resource.

In this regard, the first signal of the first communication system and the second signal of the second communication system may be received through the first antenna module and the second antenna module, respectively, thereby switching to the EN-DC state or maintaining the current state. Alternatively, 4G DL MIMO may be performed by receiving the first signal and the second signal of the 4G communication system through the first antenna module and the second antenna module. Alternatively, 5G DL MIMO may be performed by receiving the first signal and the second signal of the 5G communication system through the first antenna module and the second antenna module.

As another example, the first signal of the first communication system and the second signal of the second communication system may be transmitted through the first antenna module and the second antenna module, respectively, thereby switching to the EN-DC state or maintaining the current state. Alternatively, 4G UL MIMO may be performed by transmitting the first signal and the second signal of the 4G communication system through the first antenna module and the second antenna module. Alternatively, 5G UL MIMO may be performed by transmitting the first signal and the second signal of the 5G communication system through the first antenna module and the second antenna module.

A dual connectivity state may be specified such that the electronic device is operated in an EN-DC, NGEN-DC, or NR-DC configuration as illustrated in FIG. 1C. EN-DC or NGEN-DC band combinations may include at least one E-UTRA operating band.

Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the configuration that the electronic device having the plurality of transceivers and antennas according to the embodiment performs the MIMO and/or the CA. In this regard, the electronic devices that performs the MIMO and/or the CA may operate in an EN-DC configuration so as to be in an EN-DC state with eNB and gNB. Hereinafter, a wireless communication system including an electronic device performing MIMO and/or CA operations and a base station will be described. In this regard, FIG. 19 illustrates a block diagram of a wireless communication system that is applicable to methods proposed herein.

Figure 19:
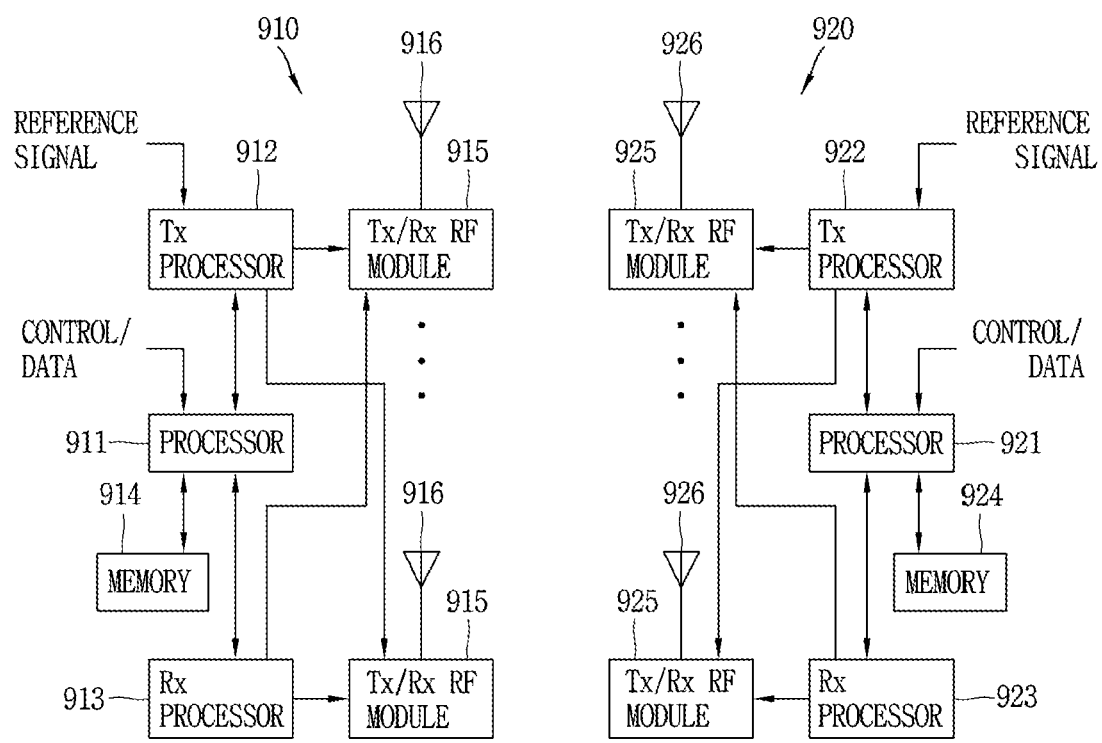
FIG. 19 is an exemplary block diagram of a wireless communication system to which methods proposed in the present disclosure are applicable.

Referring to FIG. 19, the wireless communication system includes a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal and the second communication device may denote the base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication apparatus and the second communication apparatus each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication apparatus to the second communication apparatus), an upper (high-level) layer packet from a core network may be provided to the processor 911. The processor implements the function of an L2 layer. In DL, the processor may provide multiplexing between a logical channel and a transport channel and radio resource allocation to the second communication apparatus 920, and may be in charge of signaling to the second communication apparatus. The Tx processor 912 may implement various signal processing functions for an L1 layer (i.e., a physical layer). The signal processing function may facilitate forward error correction (FEC) in the second communication apparatus, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication apparatus may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication apparatus. When a plurality of spatial streams are destined for the second communication apparatus, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication apparatus. These soft decisions may be based on channel estimate values. The soft decisions may be decoded and deinterleaved to recover data and control signal originally transmitted over the physical channel by the first communication apparatus. The corresponding data and control signal may then be provided to the processor 921.

UL (communication from the second communication apparatus to the first communication apparatus) may be processed in the first communication apparatus 910 in a similar manner to that described with respect to the receiver function in the second communication apparatus 920. The Tx/Rx modules 925 may receive signals via the antennas 926, respectively. The Tx/Rx modules may provide RF carriers and information to the RX processor 923, respectively. The processor 921 may be associated with the memory 924 that stores program codes and data. The memory may be referred to as a computer-readable medium.

Hereinafter, technical effects of an electronic device having a plurality of antennas operating according to the present disclosure will be described.

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separately provided metal rims can be used for implementing a display sliding part, thereby overcoming an antenna design space limitation and securing antenna performance of a predetermined level or higher.

According to the present disclosure, unlike the related art antenna configuration, a new wireless platform design structure can be provided by designing antennas through lateral side feeding.

Further scope of applicability of the present disclosure will become apparent from the foregoing detailed description. It should be understood, however, that the detailed description and specific examples, such as the preferred embodiment of the disclosure, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:
1. A mobile terminal that changes in size, the mobile terminal comprising:
a first metal housing including a left side surface and a right side surface defining the exterior of the mobile terminal,
a second metal housing including a left side surface, a right side surface, and a bottom side surface defining the exterior—each of a first conductive member and a second conductive member of the second metal housing includes a first sub member disposed on the bottom side surface and a second sub member disposed on the left or right side surface—;
a first printed circuit board (PCB) having a wireless communication unit;
a second PCB electrically connected to the first PCB;
a third PCB electrically connected to the second PCB; and
a display including a first region that is exposed to a front surface in a retracted state of the mobile terminal, and a second region that is an expanded region exposed to the front surface in an expanded state of the mobile terminal, wherein the left side surface of the first metal housing and the second sub member of the second metal housing overlap each other, and the overlapped first metal housing is not exposed to the exterior while the second sub member is exposed to the exterior,
a feed portion and a ground portion are connected from the second PCB to a first portion of the first metal housing, and
a contact portion having tension is disposed between the first metal housing and the second sub member.

2. The mobile terminal of claim 1, wherein a length from the contact portion to an overlap portion between the first portion and the second sub member is shorter than or equal to ¼ of an operating wavelength of an antenna disposed on at least portion of the second metal housing.

3. The mobile terminal of claim 1, wherein the first conductive member comprises the first sub member disposed on a first portion of a lower side of the second metal housing, the second sub member disposed on a first side surface of the second metal housing, and a first corner region defined between the first sub member and the second sub member, and
the first metal housing overlapping the first conductive member operates as a first antenna.

4. The mobile terminal of claim 3, wherein the second PCB further comprises a switch configured to adjust an operating band of the first antenna, and
the feed portion is electrically connected to the first metal housing at a first point, the ground portion is electrically connected at a second point adjacent to an end portion of the first metal housing, and the switch is electrically connected to the second sub member.

5. The mobile terminal of claim 1, wherein the feed portion and the ground portion are connected from the second PCB to one side of the first portion of the first metal housing, and
a second feed portion, a first ground portion, and a second ground portion are connected from the third PCB to another side of the first part of the first metal housing.

6. The mobile terminal of claim 5, wherein the second conductive member comprises the first sub member disposed on a second portion of a lower side of the second metal housing, the second sub member disposed on a second side surface of the second metal housing, and a second corner region defined between the first sub member and the second sub member, and
the first metal housing overlapping the second conductive member operates as a second antenna.

7. The mobile terminal of claim 6, wherein the second antenna forms a loop mode by the second feed portion and the first ground portion disposed adjacent to an end portion of the second sub member, and
forms an IFA mode by the second feed portion and the second ground portion disposed between the first ground portion and the second feed portion.

8. The mobile terminal of claim 5, wherein the second feed portion is electrically connected to the second sub member, and the first ground portion is electrically connected at a first point adjacent to an end portion of the first metal housing, and
the second ground portion is electrically connected at a second point of the first metal housing.

9. The mobile terminal of claim 6, wherein the second metal housing further comprises a third conductive member disposed between the first conductive member and the second conductive member, and an end portion of the first conductive member and one end portion of the third conductive member are spaced apart from each other by a first slit, and
an end portion of the second conductive member and another end portion of the third conductive member are spaced apart from each other by a second slit.

10. The mobile terminal of claim 9, wherein the first metal housing comprises a first portion, a second portion separated by a slit and exposed to the exterior, and a third portion formed inside the mobile terminal,
a slot region from which a metal is removed is defined between the third conductive member and the third portion, and
a first region of the display is disposed on a front surface of the mobile terminal corresponding to the slot region.

11. The mobile terminal of claim 10, further comprising a fourth conductive member disposed on a left side surface of the second portion of the first metal housing, and a fifth conductive member disposed on a right side surface,
wherein the fourth conductive member and the fifth conductive member operate as a third antenna and a fourth antenna, respectively, and
the wireless communication unit of the first PCB controls operations of the first antenna to the fourth antenna.

12. The mobile terminal of claim 11, wherein the second antenna is connected to a second feed portion and a ground portion from the third PCB to one side of a second portion of the second metal housing, and
the fourth antenna is connected to a fourth feed portion and a ground portion from the third PCB to another side of the second portion of the second metal housing.

13. The mobile terminal of claim 12, wherein the ground portion of the second antenna is electrically connected to the second portion at a position adjacent to an end portion of the first portion, and
the ground portion of the fourth antenna is electrically connected to the second portion at a position adjacent to a slot of the second portion.

14. The mobile terminal of claim 13, wherein the wireless communication unit controls, when only the second antenna operates, switches such that the ground portion of the second antenna is electrically connected to the third PCB through a capacitor, and the ground portion of the fourth antenna is shorted from the third PCB.

15. The mobile terminal of claim 13, wherein the wireless communication unit controls, when only the fourth antenna operates, switches such that the ground portion of the second antenna is shorted from the third PCB, and the ground portion of the fourth antenna is electrically connected to the third PCB through an inductor.

16. The mobile terminal of claim 13, wherein the wireless communication unit controls, when both the second antenna and the fourth antenna operate, switches such that the ground portion of the second antenna is electrically connected to the third PCB through a first inductor and the ground portion of the fourth antenna is electrically connected to the third PCB through a second inductor.

17. The mobile terminal of claim 13, further comprising a processor operably coupled to the wireless communication unit,
wherein the processor, when it is determined that a hand effect has occurred while only the second antenna operates, controls switches such that the ground portions of the second and fourth antennas are electrically connected to the third PCB through first and second inductors so as to operate both the second antenna and the fourth antenna.

18. The mobile terminal of claim 13, further comprising a processor operably coupled to the wireless communication unit,
  wherein the processor, when it is determined that a hand effect has occurred while only the fourth antenna operates, controls switches such that the ground portions of the second and fourth antennas are electrically connected to the third PCB through first and second inductors so as to operate both the second antenna and the fourth antenna.

19. The mobile terminal of claim 13, wherein the wireless communication unit performs carrier aggregation (CA) through the second antenna and the fourth antenna, and
  controls switches to short the ground portion of the second antenna from the third PCB such that only the fourth antenna operates.

20. The mobile terminal of claim 1, wherein the first metal housing and the second metal housing coupled by the contact portion are coupled in a spring clip contact manner that a screw is fastened to a reception portion implemented as a spring clip contact, and
  the first metal housing and the second metal housing are coupled to each other by a C-clip at a higher position than the contact portion, so as to be more in contact with each other.

* * * * *